United States Patent
Amuru et al.

(10) Patent No.: US 11,832,093 B2
(45) Date of Patent: Nov. 28, 2023

(54) METHOD AND APPARATUS FOR HANDLING A BEAM FAILURE RECOVERY IN WIRELESS COMMUNICATION SYSTEM

(71) Applicant: Samsung Electronics Co., Ltd., Suwon-si (KR)

(72) Inventors: Saidhiraj Amuru, Bangalore (IN); Hyunil Yoo, Suwon-si (KR); Anshuman Nigam, Bangalore (IN); Jiyun Seol, Seongnam-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/532,873

(22) Filed: Nov. 22, 2021

(65) Prior Publication Data
US 2022/0159711 A1  May 19, 2022

Related U.S. Application Data

(63) Continuation of application No. 16/638,127, filed as application No. PCT/KR2018/009152 on Aug. 10, 2018, now Pat. No. 11,184,920.

(30) Foreign Application Priority Data

Aug. 10, 2017 (IN) .............................. 201741028536
Jun. 4, 2018 (IN) .............................. 201741028536

(51) Int. Cl.
*H04W 16/28* (2009.01)
*H04W 74/00* (2009.01)
(Continued)

(52) U.S. Cl.
CPC ......... *H04W 74/004* (2013.01); *H04W 52/36* (2013.01); *H04W 72/046* (2013.01); *H04W 76/18* (2018.02)

(58) Field of Classification Search
CPC . H04W 74/004; H04W 52/36; H04W 72/046; H04W 76/18; H04W 74/008; H04W 16/28; H04B 7/0695; H04B 7/088
See application file for complete search history.

(56) References Cited

U.S. PATENT DOCUMENTS

2011/0299415 A1  12/2011  He et al.
2014/0177607 A1  6/2014  Li et al.
(Continued)

FOREIGN PATENT DOCUMENTS

WO  2017/024516 A1  2/2017

OTHER PUBLICATIONS

Communication pursuant to Article 94(3) EPC dated Nov. 29, 2021, in connection with European Application No. 18843730.5, 7 pages.
(Continued)

*Primary Examiner* — Anez C Ebrahim

(57) ABSTRACT

The present disclosure relates to a pre-5$^{th}$-Generation (5G) or 5G communication system to be provided for supporting higher data rates beyond 4$^{th}$-Generation (4G) communication system such as long term evolution (LTE). A terminal in a wireless communication system is provided. The terminal includes a transceiver, and at least one processor configured to receive, from a base station (BS), a beam failure recovery configuration comprising at least one reference signal for identifying a candidate beam for the beam failure recovery and associated random access (RA) parameters, identify the candidate beam for the beam failure recovery using the at least one reference signal, and perform a physical random access channel (PRACH) using the at least one reference signal and the associated RA parameters on the candidate beam for the beam failure recovery.

20 Claims, 15 Drawing Sheets

(51) Int. Cl.
*H04W 76/18* (2018.01)
*H04W 52/36* (2009.01)
*H04W 72/044* (2023.01)

(56) References Cited

U.S. PATENT DOCUMENTS

| | | | |
|---|---|---|---|
| 2014/0376466 | A1 | 12/2014 | Jeong et al. |
| 2018/0227899 | A1 | 8/2018 | Yu et al. |
| 2018/0368126 | A1* | 12/2018 | Islam .................. H04W 72/046 |
| 2020/0128455 | A1* | 4/2020 | Da Silva ........... H04W 36/0072 |
| 2020/0374960 | A1* | 11/2020 | Deenoo ............. H04W 74/0833 |
| 2021/0105820 | A1* | 4/2021 | Kim ....................... H04B 7/022 |

OTHER PUBLICATIONS

Mediatek Inc., "Discussion on Beam Recovery Mechanism," R1-1707832, 3GPP TSG RAN WG1 Meeting #89, Hangzhou, China, May 15-19, 2017, 7 pages.

"3rd Generation Partnership Project; Technical Specification Group Radio Access Network; NR; Physical layer procedures for control (Release 15)", 3GPP TS 38.213 V15.8.0 (Dec. 2019), 109 pages.

"3rd Generation Partnership Project; Technical Specification Group Radio Access Network; NR; Medium Access Control (MAC) protocol specification (Release 15)", 3GPP TS 38.321 V15.8.0 (Dec. 2019), 78 pages.

"3rd Generation Partnership Project; Technical Specification Group Radio Access Network; NR; Radio Resource Control (RRC) protocol specification (Release 15)", 3GPP TS 38.331 V.15.8.0 (Dec. 2019), 532 pages.

LG Electronics, "Discussion on beam failure recovery", 3GPP TSG RAN WG1 Meeting #89, May 15-19, 2017, R1-1707606, 5 pages.

NEC, "Low Latency beam failure recovery by PRACH/PRACH-like", 3GPP TSG RAN WG1 Meeting #89, May 15-19, 2017, R1-1707814, 2 pages.

NTT Docomo, Inc., "Further views on mechanism to recover from beam failure", 3GPP TSG RAN WG1 Meeting #89, May 15-19, 2017, R1-1708452, 6 pages.

MediaTek, "[Draft] LS to RAN2 on Beam Failure Recovery", 3GPP TSG RAN WG1 Meeting #91, Nov. 27-Dec. 1, 2017, 2 pages.

Ericsson, "Beam failure recovery mechanism", 3GPP TSG-RAN WG1 #89, May 15-19, 2017, R1-1708678, 8 pages.

Samsung, "Discussion on aperiodic indications from beam failure recovery related with RLF", 3GPP TSG-RAN2 #101 bis, Apr. 16-20, 2018, R2-1806054, 6 pages.

International Search Report dated Nov. 20, 2018 in connection with International Patent Application No. PCT/KR2018/009152, 3 pages.

Written Opinion of the International Searching Authority dated Nov. 20, 2018 in connection with International Patent Application No. PCT/KR2018/009152, 6 pages.

ZTE, "Discussion on beam recovery mechanism", 3GPP TSG RAN WG1 NR Ad-Hoc#2, Jun. 27-30, 2017, R1-1710185, 9 pages.

Supplementary European Search Report dated May 6, 2020 in connection with European Patent Application No. 18 84 3730, 12 pages.

Notice of Preliminary Rejection dated Mar. 17, 2023, in connection with Korean Application No. 10-2020-7006796, 13 pages.

3GPP TS 38.321 V0.1.0 (Jun. 2017), Technical Specification, 3rd Generation Partnership Project; Technical Specification Group Radio Access Network; NR; Medium Access Control (MAC) protocol specification (Release 15), Jun. 2017, 31 pages.

Notice of Final Rejection dated Sep. 21, 2023, in connection with Korean Patent Application No. 10-2020-7006796, 7 pages.

\* cited by examiner

[Fig. 1]
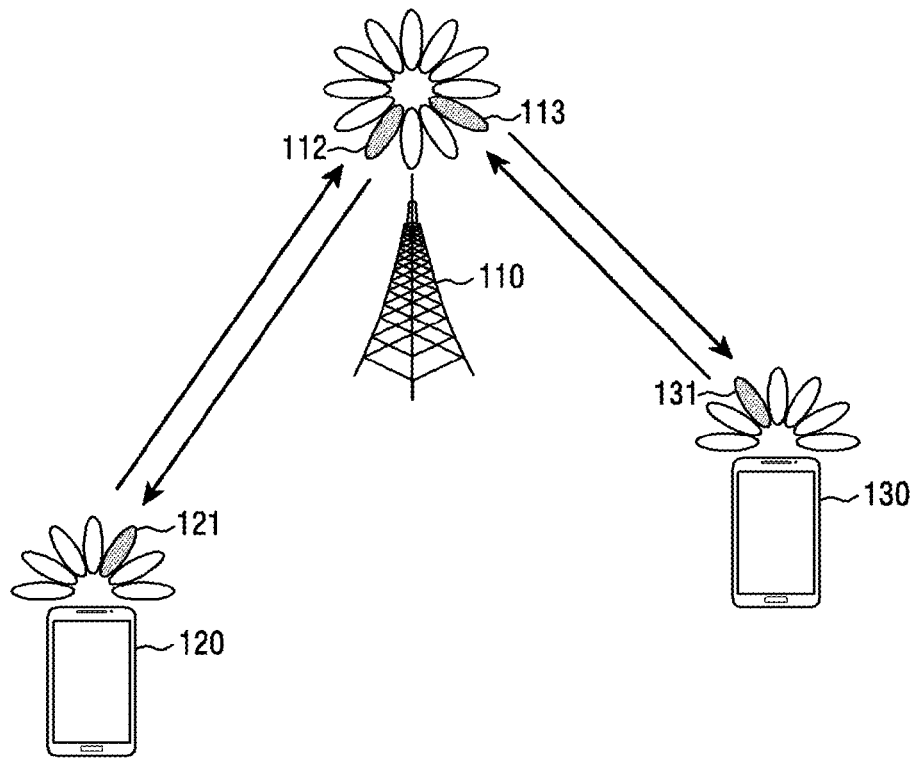
[Fig. 2]
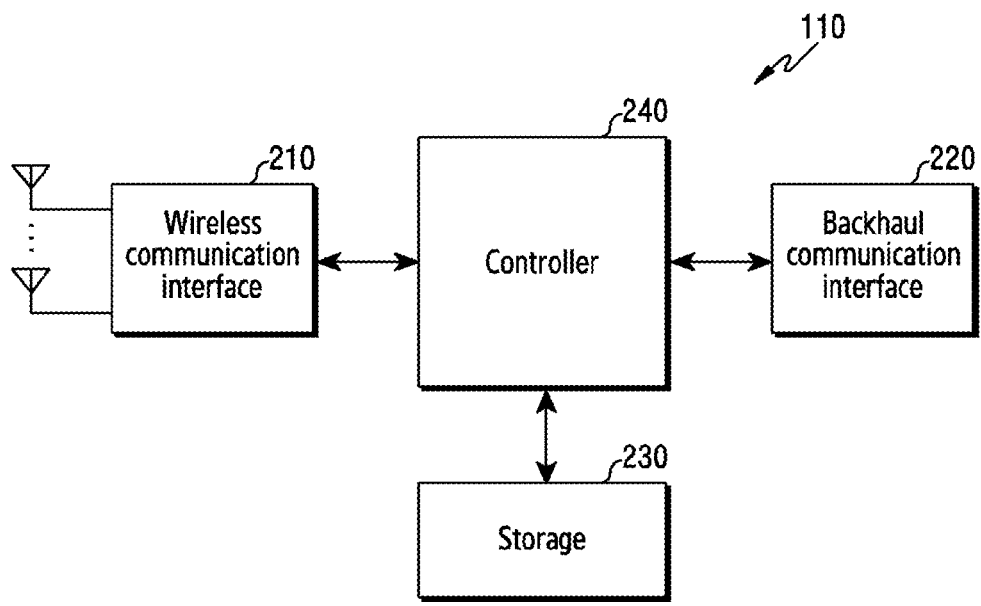

[Fig. 3]
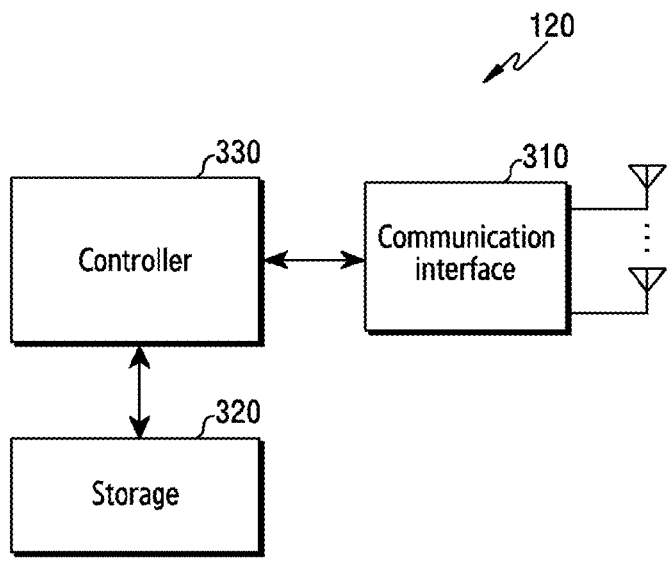
[Fig. 4]
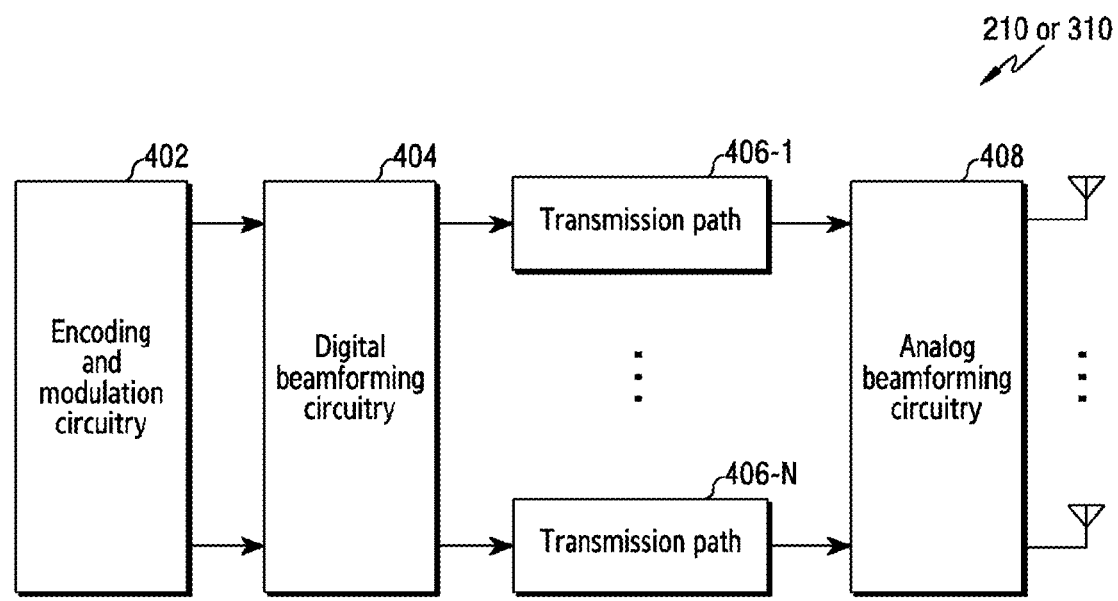

[Fig. 5]
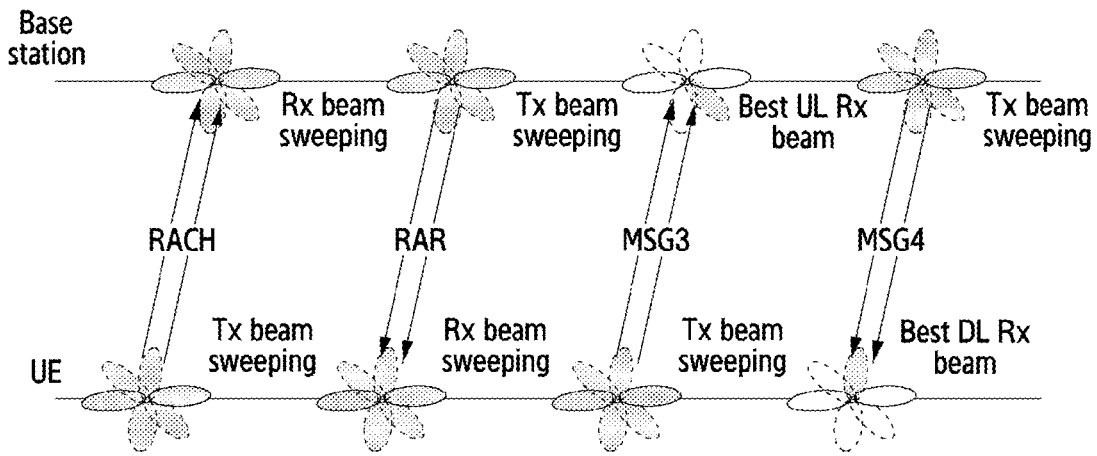
[Fig. 6]
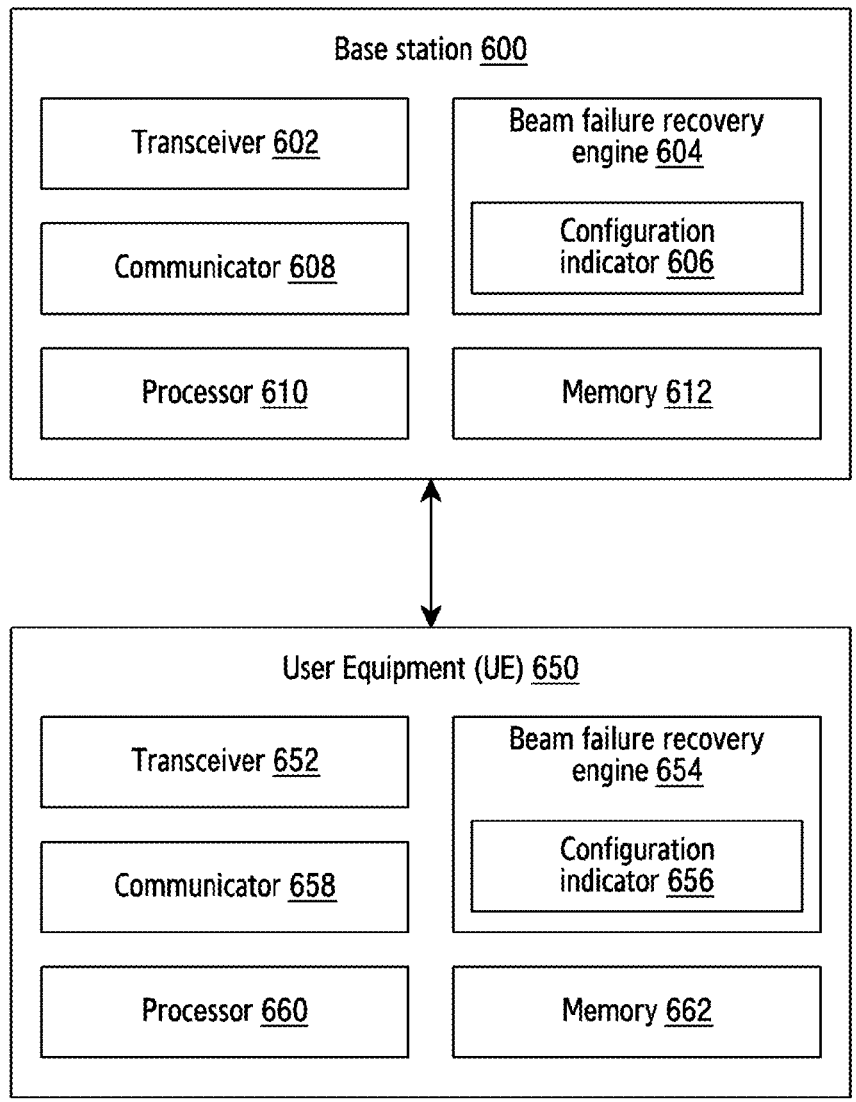

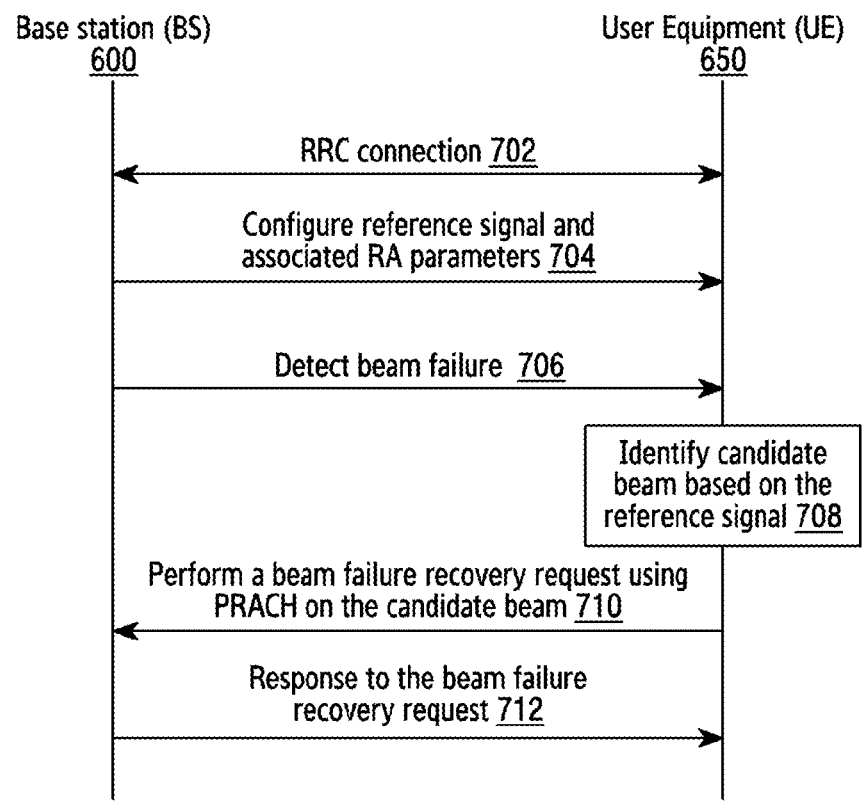

[Fig. 8A]
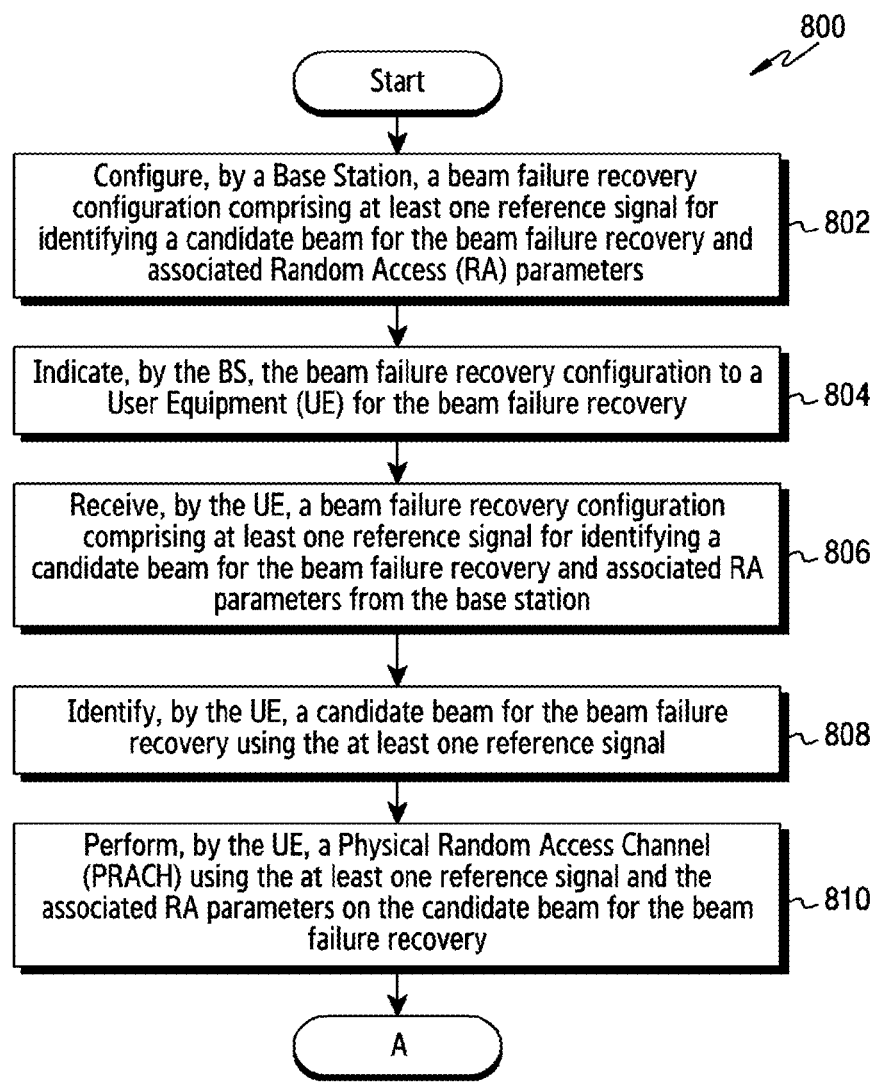

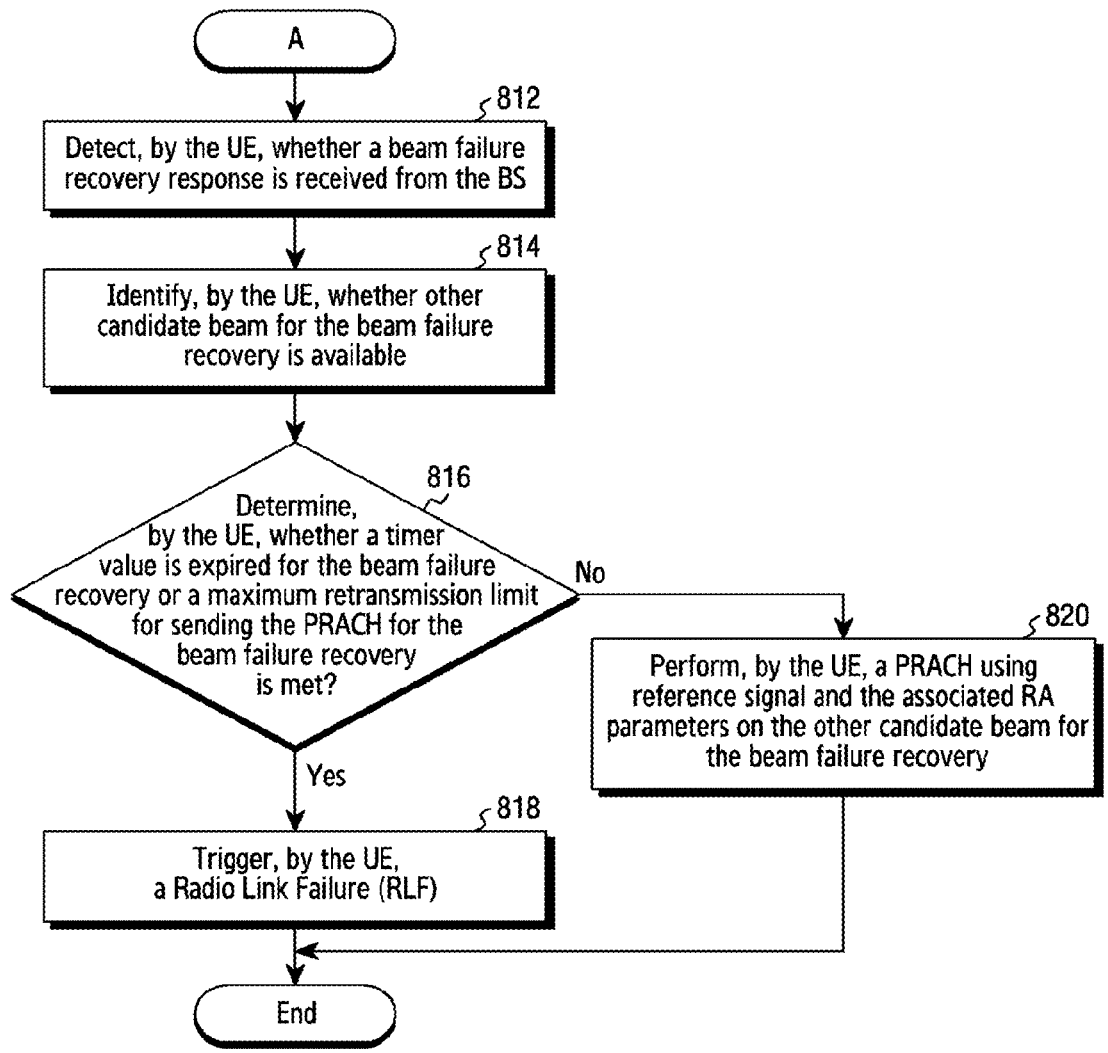
[Fig. 8B]

[Fig. 9]
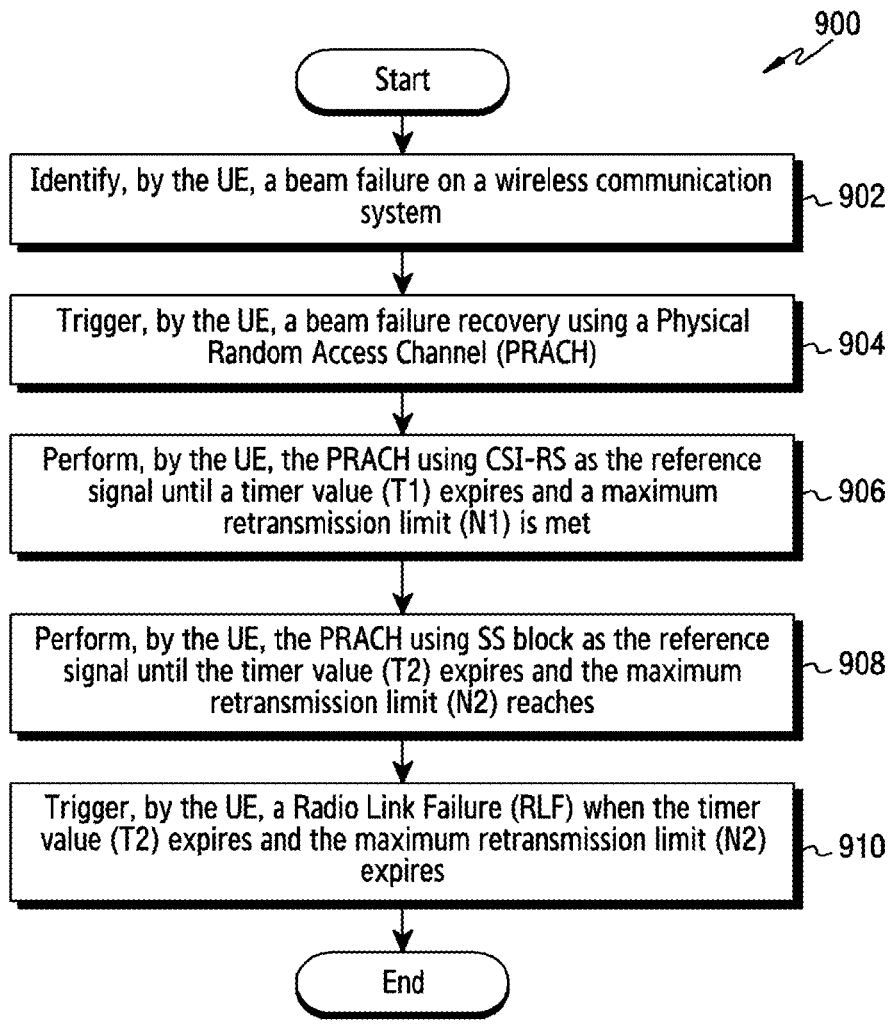
[Fig. 10A]
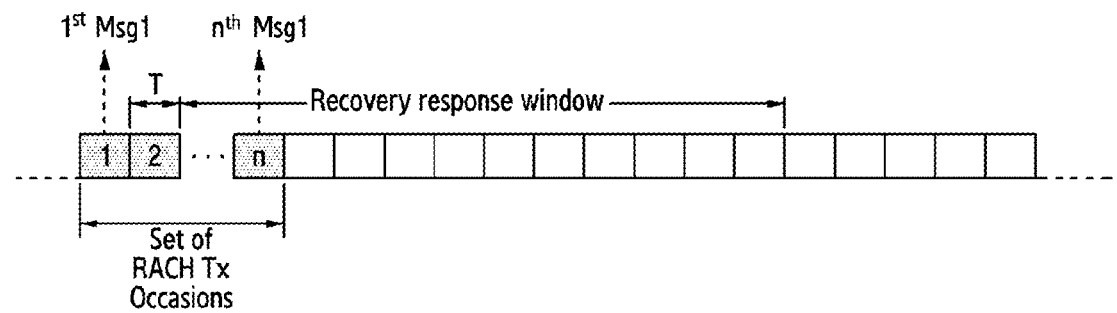

[Fig. 10B]
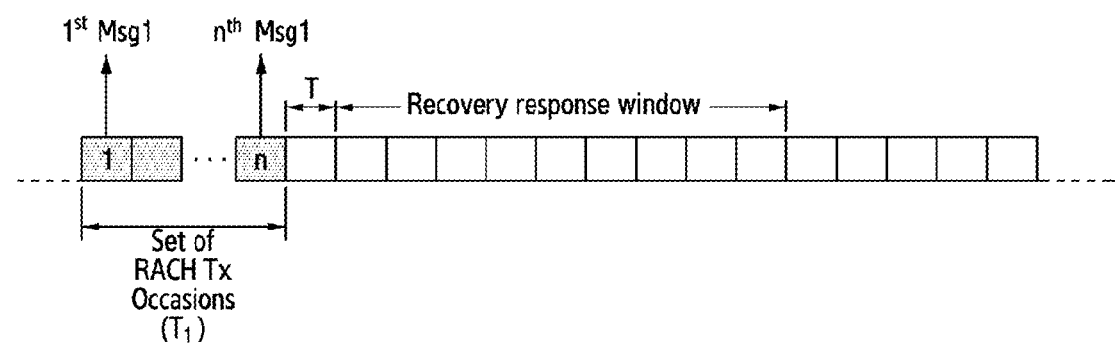
[Fig. 10C]
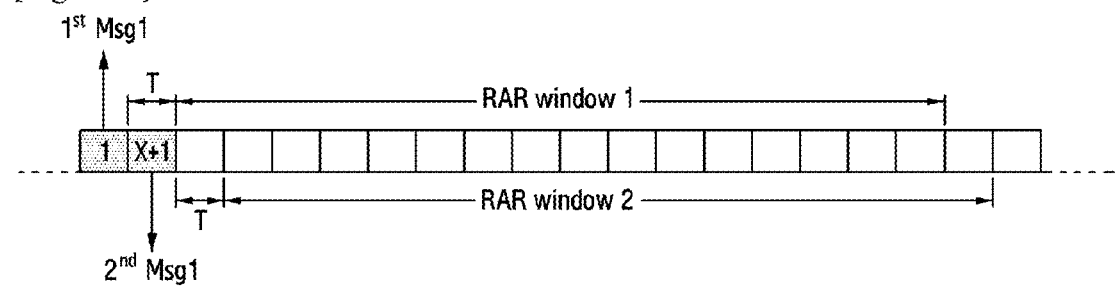

METHOD AND APPARATUS FOR HANDLING A BEAM FAILURE RECOVERY IN WIRELESS COMMUNICATION SYSTEM

CROSS-REFERENCE TO RELATED APPLICATIONS

This application is a continuation of U.S. patent application Ser. No. 16/638,127 filed on Feb. 10, 2020, which is a 371 of International Application No. PCT/KR2018/009152 filed on Aug. 10, 2018, which claims priority to India Patent Application No. 201741028536 filed on Aug. 10, 2017, and India Patent Application No. 201741028536 filed on Jun. 4, 2018, the disclosures of which are herein incorporated by reference in their entirety.

BACKGROUND

1. Field

The present disclosure generally relates to a wireless communication system. More specifically, this disclosure relates to a method and an apparatus for handling a beam failure recovery in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Generally, mobile communication systems have been developed for providing a high quality mobile communication services to a user. With the dramatic development of communication technologies, the mobile communication systems are now capable of providing high-speed data communication services as well as voice communication services. A Long Term Evolution (LTE) is a technology for implementing a packet-based communication at a higher data rate of a maximum of about 100 Mbps. In order to meet the demand for an increased wireless data traffic, since deployment of $4^{th}$ generation (4G) communication systems, efforts have been made to develop an improved $5^{th}$ generation (5G) communication systems or a LTE-Advanced communication system. Therefore, the 5G or LTE-Advanced communication system is also called a 'beyond 4G network' or a 'post LTE system'. The 4G communication systems operate in sub-6 GHz spectrum bands, where all transmissions and receptions take place in an Omni-directional manner.

In order to achieve a high data transmission rate, the 5G communication system is considered to be implemented in a millimeter wave (mm Wave) or extremely higher frequency bands as well, for e.g., 28 GHz, 60 GHz, etc., so as to accomplish higher data rates. For achieving the higher frequency bands, it has been shown that a beam forming is necessary for a successful communication to be performed as shown in FIG. 5. In such instance, a random access procedure is performed for providing a communication between a User Equipment (UE) and a Base Station (BS). The UE performs an initial access procedure by scanning for Primary Synchronization Signal (PSS), Secondary Synchronization Signal (SSS) and then becoming synchronized in a downlink. Upon synchronization, the random access procedure is performed in order to acquire an uplink synchronization for performing uplink transmissions appropriately.

Further, the UE is configured to monitor a radio link for determining a quality of the downlink (DL) in order to continue with a transmission. As the 5G communication system operates in the millimeter waves, there may cause a sudden blockage in the radio link then, the UE may not receive a signal from the BS. Hence, there is a need for the UE to determine that there exists the beam failure and perform the beam failure recovery procedure.

Thus, it is desired to address the above mentioned disadvantages or other shortcomings or at least provide a useful alternative.

SUMMARY

Embodiments of the present disclosure provide a method and an apparatus for handling a beam failure recovery in a wireless communication system.

Embodiments of the present disclosure provide a method and apparatus for configuring by a BS a beam failure recovery configuration include at least one reference signal for identifying a candidate beam for the beam failure recovery and associated Random Access (RA) parameters.

Embodiments of the present disclosure provide a method and apparatus for indicating the beam failure recovery configuration to a UE for the beam failure recovery.

Embodiments of the present disclosure provide a method and apparatus for configuring the beam failure recovery configuration for any one of a Contention-Free Random Access Physical Random Access Channel (CFRA PRACH) and a Contention-Based Random Access Physical Random Access Channel PRACH (CBRA PRACH).

Embodiments of the present disclosure provide a method and apparatus for identifying by the UE the candidate beam for the beam failure recovery using the at least one reference signal.

Embodiments of the present disclosure provide a method and apparatus for performing by the UE a PRACH using the at least one reference signal and the associated RA parameters on the candidate beam for the beam failure recovery.

Embodiments of the present disclosure provide a method and apparatus for detecting whether a beam failure recovery response is received from the BS.

Embodiments of the present disclosure provide a method and apparatus for identifying whether other candidate beam for the beam failure recovery is available.

Embodiments of the present disclosure provide a method and apparatus for determining whether a timer value is expired for performing the beam failure recovery.

Embodiments of the present disclosure provide a method and apparatus for determining whether a maximum retransmission limit for sending the PRACH for the beam failure recovery is met.

Embodiments of the present disclosure provide a method and apparatus for performing the PRACH using reference signal and the associated RA parameters on the other candidate beam for the beam failure recovery, when the timer value and the maximum retransmission limit is not expired.

Embodiments of the present disclosure provide a method and apparatus for triggering a Radio Link Failure (RLF), when the timer value and the maximum retransmission limit has expired.

In one embodiment, a method for handling a beam failure recovery in a wireless communication system is provided. The method includes configuring, by a BS, a beam failure recovery configuration include at least one reference signal for identifying a candidate beam for the beam failure recovery and associated Random Access (RA) parameters. Further, the method includes indicating, by the B S, the beam failure recovery configuration to a UE for the beam failure recovery.

In another embodiment, the at least one reference signal is one of a Synchronization Signal (SS) block and a Channel State Information Reference Signal (CSI-RS).

In yet another embodiment, the associated RA parameters include a RACH preamble, RACH resources in a time domain and a frequency domain, a timer value, a maximum retransmission limit, a power ramping value and a Random Access Response (RAR) window response configuration and preamble indices.

In yet another embodiment, the beam failure recovery configuration is configured for any one of a Contention-Free Random Access Physical Random Access Channel (CFRA PRACH) and a Contention-Based Random Access Physical Random Access Channel PRACH (CBRA PRACH).

Accordingly embodiments herein provide a method for handling a beam failure recovery in a wireless communication system. The method includes receiving, by a UE, a beam failure recovery configuration include at least one reference signal for identifying a candidate beam for the beam failure recovery and associated RA parameters from a BS. Further, the method includes identifying, by the UE, the candidate beam for the beam failure recovery using the at least one reference signal. Furthermore, the method includes performing, by the UE, a PRACH using the at least one reference signal and the associated RA parameters on the candidate beam for the beam failure recovery.

In yet another embodiment, the CFRA PRACH or the CBRA PRACH to be performed is identified based on the associated Random Access (RA) parameters configured to the UE on the candidate beam for the beam failure recovery.

In yet another embodiment, the CFRA PRACH is performed using the SS block as the reference signal and the associated RA parameters on the candidate beam for the beam failure recovery.

In yet another embodiment, the CFRA PRACH is performed using the CSI-RS as the reference signal and the associated RA parameters on the candidate beam for the beam failure recovery.

In yet another embodiment, the CFRA PRACH is performed using the CSI-RS as the reference signal and the associated RA parameters on the candidate beam for the beam failure recovery and further performing the PRACH by using the SS block as the reference signal and the associated RA parameters on the candidate beam for the beam failure recovery.

In yet another embodiment, the CBRA PRACH is performed using the SS block as the reference signal and the associated RA parameters on the candidate beam for beam failure recovery.

In yet another embodiment, the candidate beam is identified based on a Reference Signal Received Power (RSRP) threshold configured for the beam failure recovery.

In yet another embodiment, the method further includes detecting, by the UE, whether a beam failure recovery response is received from the BS. Further, the method includes identifying by the UE whether other candidate beam for the beam failure recovery is available. Further, the method includes determining by the UE whether a timer value is expired for performing the beam failure recovery or a maximum retransmission limit for sending the PRACH for the beam failure recovery is met based on the indication of associated RA parameters. Furthermore, the method includes causing by the UE one of:
a. performing, by the UE, a PRACH using reference signal and the associated RA parameters on the other candidate beam for the beam failure recovery when the timer value is not expired or the maximum retransmission limit for sending the PRACH for the beam failure recovery is not met; and
b. triggering, by the UE, a Radio Link Failure (RLF) when the timer value is expired for performing the beam failure recovery or the maximum retransmission limit for sending the PRACH for the beam failure recovery is met.

In yet another embodiment, the PRACH is one of a CFRA PRACH and a CBRA PRACH.

In yet another embodiment, the CFRA PRACH or the CBRA PRACH to be performed is identified based on the associated Random Access (RA) parameters configured to the UE on the other candidate beam for the beam failure recovery.

In yet another embodiment, the CFRA PRACH is performed using the SS block as the reference signal and the associated RA parameters on the other candidate beam for the beam failure recovery.

In yet another embodiment, the CFRA PRACH is performed using the CSI-RS as the reference signal and the associated RA parameters on the other candidate beam for the beam failure recovery.

In yet another embodiment, the CFRA PRACH is performed using the CSI-RS as the reference signal and the associated RA parameters on the other candidate beam for the beam failure recovery and then by using the SS block as the reference signal and the associated RA parameters on the other candidate beam for the beam failure recovery.

In yet another embodiment, the CBRA PRACH is performed using a SS block as the reference signal and the associated RA parameters on the candidate beam for beam failure recovery.

In yet another embodiment, a BS for handling a beam failure recovery in a wireless communication system is provided. The BS includes a beam failure recovery engine coupled with a memory and a processor. The beam failure recovery engine configures a beam failure recovery configuration include at least one reference signal for identifying a candidate beam for the beam failure recovery and associated Random Access (RA) parameters. Further, the beam failure recovery engine is configured to indicate the beam failure recovery configuration to a UE for the beam failure recovery.

In yet another embodiment, a UE for handling a beam failure recovery in a wireless communication system is provided. The UE includes a beam failure recovery engine coupled with a memory and a processor. The beam failure recovery engine is configured to receive a beam failure recovery configuration include at least one reference signal for identifying a candidate beam for the beam failure recovery and associated RA parameters from a BS. Further, the beam failure recovery engine is configured to identify a candidate beam for the beam failure recovery using the at least one reference signal. Furthermore, the beam failure recovery engine is configured to perform a PRACH using the at least one reference signal and the associated RA parameters on the candidate beam for the beam failure recovery.

In yet another embodiment, a base station (BS) in a wireless communication system is provided. The base station includes at least one processor configured to configure a beam failure recovery configuration comprising at least one reference signal for identifying a candidate beam for beam failure recovery and associated random access (RA) parameters; and a transceiver configured to: transmit, to the terminal, the beam failure recovery configuration, and receive, from the terminal, a random access preamble for the beam failure recovery which is transmitted on the identified candidate beam.

In yet another embodiment, a terminal in a wireless communication system is provided. The terminal includes at least one processor; and a transceiver configured to: receive, from a base station (BS), a beam failure recovery configuration, and transmit, to the BS, a random access preamble for the beam failure recovery which is transmitted on the identified candidate beam, wherein the beam failure recovery configuration comprises at least one reference signal for identifying a candidate beam for beam failure recovery and associated random access (RA) parameters.

In yet another embodiment, a method for operating a base station (BS) in a wireless communication system is provided. The method includes receiving, from a base station (BS), a beam failure recovery configuration; and transmitting, to the BS, a random access preamble for the beam failure recovery which is transmitted on the identified candidate beam, wherein the beam failure recovery configuration comprises at least one reference signal for identifying a candidate beam for beam failure recovery and associated random access (RA) parameters.

In yet another embodiment, a method for operating a terminal in a wireless communication system is provided. The method includes receiving, from a base station (BS), a beam failure recovery configuration; and transmitting, to the BS, a random access preamble for the beam failure recovery which is transmitted on the identified candidate beam, wherein the beam failure recovery configuration comprises at least one reference signal for identifying a candidate beam for beam failure recovery and associated random access (RA) parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

A method and an apparatus according to various embodiments of the present disclosure allows to cope with a sudden blockage in the radio link by determining that there exists the beam failure and performing the beam failure recovery procedure.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is an example RACH procedure for beam forming in a 5G communication system, according to a prior art;

FIG. 6 is a block diagram of a wireless communication system in which a BS communicates with a UE, according to an embodiment as disclosed herein;

FIG. 7 is a sequence diagram illustrating various signaling messages communicated between the BS and the UE for handling a beam failure recovery in the wireless communication system, according to an embodiment as disclosed herein;

FIG. 8A is a flow diagram illustrating various operations for handling the beam failure recovery in the wireless communication system, according to an embodiment as disclosed herein;

FIG. 8B is a flow diagram illustrating various operations for handling the beam failure recovery in the wireless communication system, according to an embodiment as disclosed herein;

FIG. 9 is a flow diagram illustrating various operations performed by the UE for sending a PRACH for the beam failure recovery, according to an embodiment as disclosed herein;

FIGS. 10A-10C are illustrating a scenario in which a recovery response is received from the BS for the beam failure recovery, according to an embodiment as disclosed herein;

FIG. 17 is a schematic diagram illustrating various kinds of RACH mapping according to various embodiments of the present disclosure.

DETAILED DESCRIPTION

Figure 11:
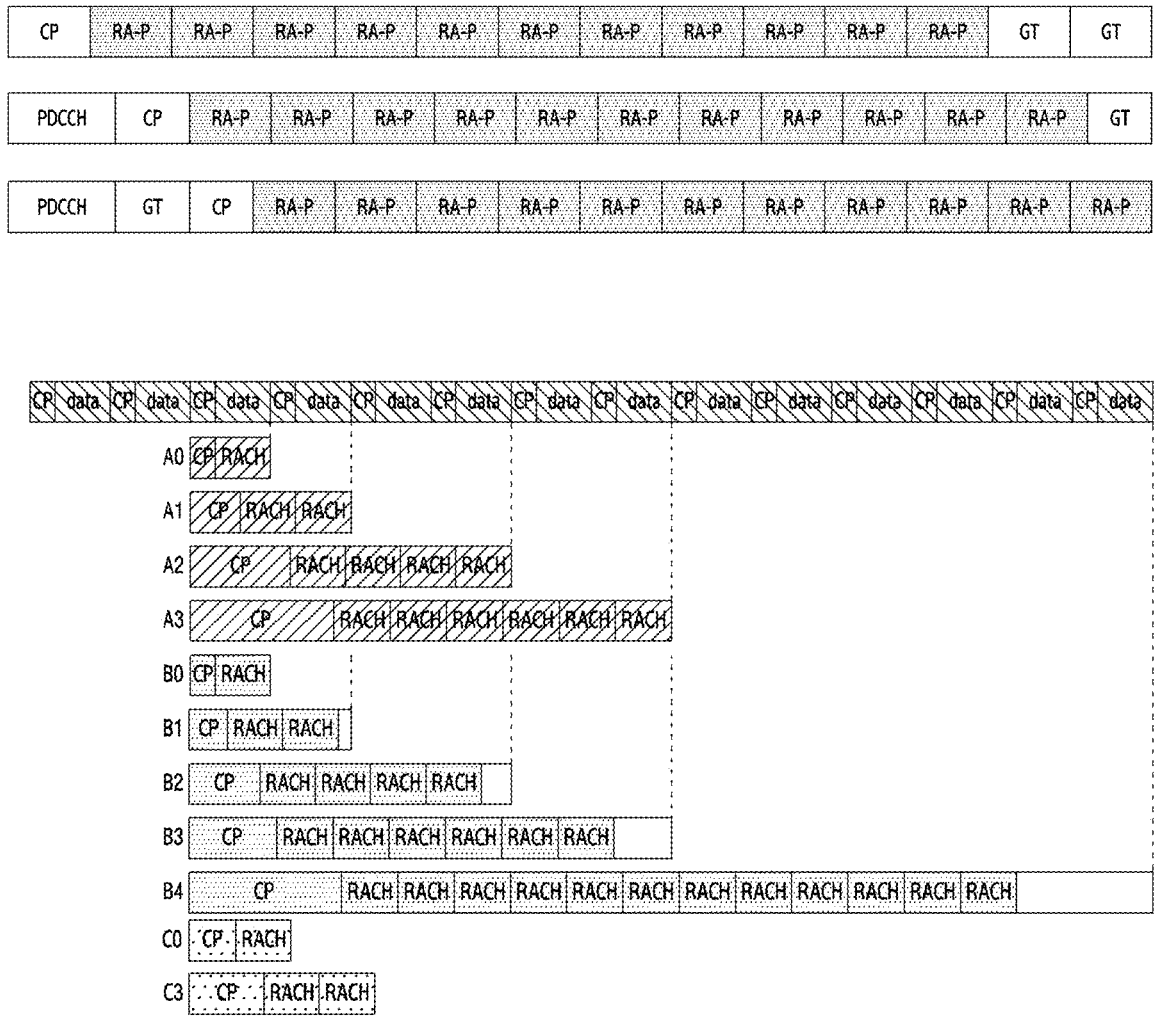
FIG. 11 is a schematic diagram illustrating multiple preamble formats for short sequence length according to various embodiments of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term 'NR' is "new radio" is the term used by 3GPP specification for discussing activities about 5G communication systems.

The term "base station" and "gNB" used herein can be used interchangeably without departing from the scope of the embodiments. Further, the term "mapping" and "association" used herein can be used interchangeably without departing from the scope of the embodiments.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for handling a beam failure recovery in a wireless communication system.

The terms referring to a beam failure recovery configuration, the terms referring to a candidate beam, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may includes a command/code temporarily resided in the controller 240, a storage space that stores the command/code, or a part of circuitry of the controller 240.

According to exemplary embodiments of the present disclosure, the controller 240 may configure a beam failure recovery configuration comprising at least one reference signal for identifying a candidate beam for the beam failure recovery and associated random access (RA) parameters, and transmit, to a terminal, the beam failure recovery configuration for the beam failure recovery. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may includes a command/code temporarily resided in the controller 330, a storage space that stores the command/code, or a part of circuitry of the controller 330.

According to exemplary embodiments of the present disclosure, the controller 330 may receive, from a base station (BS), a beam failure recovery configuration comprising at least one reference signal for identifying a candidate beam for the beam failure recovery and associated random access (RA) parameters, identify the candidate beam for the beam failure recovery using the at least one reference signal, and perform a physical random access channel (PRACH) using the at least one reference signal and the associated RA parameters on the candidate beam for the beam failure recovery. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Embodiments herein provide a method for handling a beam failure recovery in a wireless communication system. The method includes configuring, by a BS, a beam failure recovery configuration include at least one reference signal for identifying a candidate beam for the beam failure recovery and associated Random Access (RA) parameters. Further, the method includes indicating, by the B S, the beam failure recovery configuration to a UE for the beam failure recovery.

Embodiments herein provide a method for handling a beam failure recovery in a wireless communication system. The method includes receiving, by a UE, a beam failure recovery configuration include at least one reference signal for identifying a candidate beam for the beam failure recovery and associated RA parameters from a BS. Further, the method includes identifying, by the, UE a candidate beam for the beam failure recovery using the at least one reference signal. Furthermore, the method includes performing, by the UE, a PRACH using the at least one reference signal and the associated RA parameters on the candidate beam for the beam failure recovery.

Unlike conventional methods and systems, the proposed method can be used for handling the beam failure recovery using the PRACH. The proposed method allows the UE to send the PRACH for a beam failure recovery request. Further, the proposed method can be used to detect whether a beam failure recovery response is received within a timer value and a maximum retransmission limit. Further, the proposed method can be used to report a Radio Link Failure (RLF) to the BS, when the timer value and the maximum retransmission limit is expired. This results in performing the beam failure recovery in an enhanced manner.

The proposed method can be used to identify a candidate beam based on Reference Signal Received Power (RSRP) measurement of plurality of beams. Further, the proposed method can select the beam as the candidate beam when the beam reaches a threshold value in the RSRP measurement. Furthermore, the proposed method can perform the beam failure recovery by sending the PRACH on the identified candidate beam.

Unlike conventional methods and systems, the proposed method allows the UE to perform the beam failure recovery by sending the PRACH using a narrow beam signal (e.g., CSI-RS), and wait for the beam failure recovery response from the BS, until the timer value and the maximum retransmission limit is expired for the narrow beam signal. If the timer value and the maximum retransmission limit has expired for the narrow beam signal then, the UE can send the PRACH using a broad beam signal (e.g., SS block), and wait for the beam failure recovery response from the BS, until the timer value and the maximum retransmission limit is expired for the broad beam signal. Further, the UE can report the RLF to the BS in response to failure in receiving the beam failure recovery response within the timer value and the maximum retransmission limit.

The proposed method herein is applicable for any future wireless technologies that can be built upon beam-forming based systems. It should be noted that irrespective of the exact signals used i.e., SS block and CSI-RS, the embodiments in the proposed method and system are applicable for all cases where wide beams and/or narrow beams are used.

Referring now to the drawings, and more particularly to FIGS. 6 through 17, there are shown preferred embodiments.

FIG. 6 is a block diagram of a wireless communication system in which a BS 600 communicates with a UE 650, according to an embodiment as disclosed herein. In an embodiment, the BS 600 includes a transceiver 602, a beam failure recovery engine 604 includes a configuration indicator 606, a communicator 608, a processor 610, and a memory 612. The BS 600 can be for example but not limited to a next Generation NodeB (gNB), evolved NodeB (eNB), NR, and the like. The transceiver 602 can be configured to communicate with the UE 650 for performing a transmission and reception of signals.

In an embodiment, the beam failure recovery engine 654 configures a beam failure recovery configuration include at least one reference signal for identifying a candidate beam for the beam failure recovery and associated Random Access (RA) parameters. In an example, the at least one reference signal is one of a Synchronization Signal (SS) block and a Channel State Information Reference Signal (CSI-RS), where the SS block is a broad beam and the CSI-RS is a narrow beam.

In an embodiment, the beam failure recovery configuration is configured for any one of a Contention-Free Random Access Physical Random Access Channel (CFRA PRACH) and a Contention-Based Random Access Physical Random Access Channel PRACH (CBRA PRACH). In a contention-free procedure such as the CFRA PRACH, each UE 650 is given with dedicated resources for sending a random access preamble to the BS 600. In a contention-based procedure such as the CBRA PRACH, the UE 650 needs to contend with several other UEs in order to successfully connect with the BS 600.

In an embodiment, the associated RA parameters include a RACH preamble, RACH resources in a time domain and a frequency domain, a timer value, a maximum retransmission limit, a power ramping value and a Random Access Response (RAR) window response configuration and preamble indices.

The associated RA parameters such as the timer value, maximum retransmission limit for the beam failure recovery can be:
  a) fixed in MAC specification/3GPP standard specification, or
  b) indicated to the UE 650 using a Radio Resource Control (RRC) signaling, a Downlink Control Indicator (DCI) and MAC Control Element (MAC-CE) signaling.

In an embodiment, the configuration indicator 606 is configured to indicate the beam failure recovery configuration to the UE 650 for the beam failure recovery. The configuration indicator 606 is configured to indicate the beam failure recovery configuration using at least one of the RRC signaling, a DCI and a MAC-CE signaling.

In an embodiment, the communicator 608 is configured to communicate with the UE 650 and internally between hardware components in the BS 600. In an embodiment, the processor 610 is configured to process various instructions stored in the memory 612 for handling the beam failure recovery in the wireless communication system.

The memory 612 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 612 may, in some examples, be considered a non-transitory storage medium. The term "non-transitory" may indicate that the storage medium is not embodied in a carrier wave or a propagated signal. However, the term "non-transitory" should not be interpreted that the memory 612 is non-movable. In some examples, the memory 612 can be configured to store larger amounts of information than the memory. In certain examples, a non-transitory storage medium may store data that can, over time, change (e.g., in Random Access Memory (RAM) or cache).

In an embodiment, the UE 650 includes a transceiver 652, a beam failure recovery engine 654 includes an association engine 656, a communicator 658, a processor 660 and a memory 662. The transceiver 652 can be configured to communicate with the BS 600 for performing a transmission and reception of signals.

The UE 650 can include, for e.g., a cellular telephone, a smartphone, a personal computer (PC), a minicomputer, a desktop, a laptop, a handheld computer, Personal Digital Assistant (PDA), or the like. The UE 650 may support multiple Radio access technologies (RAT) such as, for e.g., Code-division multiple access (CDMA), General Packet Radio Service (GPRS), Evolution-Data Optimized EVDO (EvDO), Time-division multiple access (TDMA), GSM (Global System for Mobile Communications, WiMAX (Worldwide Interoperability for Microwave Access) technology, LTE, LTE Advanced and 5G communication technologies.

In an embodiment, the beam failure recovery engine 654 is configured to receive the beam failure recovery configuration include the at least one reference signal for identifying the candidate beam for the beam failure recovery and associated RA parameters from the BS 600.

In an embodiment, beam failure recovery configuration include at least one reference signal for identifying the candidate beam for the beam failure recovery and associated Random Access (RA) parameters. The associated RA parameters include a RACH preamble, RACH resources in a time domain and a frequency domain, a timer value, a maximum retransmission limit, a power ramping value and a Random Access Response (RAR) window response configuration and preamble indices.

In an embodiment, the RACH resources includes a SS block resource and a CSI-RS Resource. The SS block-resource includes SS block-Index and a RACH preamble Index. The SS block-Index is used by the UE 650 to perform the beam failure recovery upon identifying the candidate beam from the reference signal (e.g., SS block) and the RACH preamble index is an integer value.

The CSI-RS Resource includes a CSI-RS Index and Non-Zero-Power (NZP)-CSI-RS-Resource Id and the RACH preamble Index. The NZP-CSI-RS-Resource Id indicate RA occasions that the UE 650 can use during the beam failure recovery, upon selecting the candidate beam identified by this CSI-RS.

If a field (such as NZP-CSI-RS-Resource Id) is not available in the beam failure configuration then, the UE 650 can use the RA occasion associated with the SS block that is Quasi Co-Location (QCL) with the CSI-RS. Further, the UE 650 can use the preamble index for the RA occasions associated with the CSI-RS. If the preamble indices is not available in the beam failure configuration, the UE 650 uses the preamble index associated with the SS block that is in QCL relationship with the CSI-RS.

In an embodiment, the candidate beam identifier 656 is configured to identify the candidate beam for the beam failure recovery using the at least one reference signal. The candidate beam identifier 656 identifies the candidate beam based on a Reference Signal Received Power (RSRP) threshold configured for the beam failure recovery.

In an embodiment, a Layer 1 (L1)-RSRP threshold can used for determining whether the candidate beam can be used by the UE 650 to attempt contention-free PRACH. The list of reference signals (such as CSI-RS and/or SSB) identifies the candidate beams for the beam failure recovery.

Further, the beam failure recovery engine 654 is configured to perform a PRACH using the at least one reference signal and the associated RA parameters on the candidate beam for the beam failure recovery. In an example, the PRACH is one of a Contention-Free Random Access Physical Random Access Channel (CFRA PRACH) and a Contention-Based Random Access Physical Random Access Channel PRACH (CBRA PRACH).

In an embodiment, the beam failure recovery engine 654 is configured to determine whether the CFRA PRACH or the CBRA PRACH to be based on the associated RA parameters configured to the UE 650 on the candidate beam for the beam failure recovery.

In an embodiment, the beam failure recovery engine 654 is configured to perform the CFRA PRACH using the SS block as the reference signal and the associated RA parameters on the candidate beam for the beam failure recovery.

In another embodiment, the beam failure recovery engine 654 is configured to perform the CFRA PRACH using the CSI-RS as the reference signal and the associated RA parameters on the candidate beam for the beam failure recovery.

In yet another embodiment, the beam failure recovery engine 654 is configured to perform the CFRA PRACH using the CSI-RS as the reference signal and the associated RA parameters on the candidate beam for the beam failure recovery and then by using the SS block as the reference signal and the associated RA parameters on the candidate beam for the beam failure recovery.

The RAR window starts immediately after the PRACH (i.e., Msg1) transmission. The BS 600 configures a length of the RAR window as "X" symbols/slot. The BS 600 can configure the UE 650 to send multiple Msg1 for the beam failure recovery purposes. Further, the UE 650 can transmit multiple Msg1 for the beam failure recovery, when the multiple candidate beams are identified.

In an embodiment, the beam failure recovery engine 654 is configured to perform the CBRA PRACH is performed using the SS block as the reference signal and the associated RA parameters on the candidate beam for beam failure recovery.

In an embodiment, the beam failure recovery engine 654 is configured to detect whether the beam failure recovery response is received from the BS 600. In an embodiment, the beam failure is detected by lower layers and indicated to the MAC entity. The MAC entity perform the following:
1. if the beam failure indication has been received from the lower layers:
   a. Start beam Failure Recovery Timer; and
   b. Initiate a Random Access procedure on the Primary Secondary cell (SpCell).
2. If the beam Failure Recovery Timer expires:
   a. Indicate a failure of a beam failure recovery request to higher layers.

In an embodiment, the beam failure recovery engine 654 is configured to identify whether other candidate beam for the beam failure recovery is available. Further, the beam failure recovery engine 654 is configured to determine whether the timer value has expired for performing the beam failure recovery or the maximum retransmission limit for sending the PRACH for the beam failure recovery is met based on the indication of associated RA parameters.

In an embodiment, two counters such as a PREAMBLE_TRANSMISSION_COUNTER for the beam failure recovery and a PREAMBLE_POWER_RAMPING_COUNTER for the beam failure recovery are defined in the MAC specification. The MAC entity initializes PREAMBLE_TRANSMISSION_COUNTER for beam failure recovery and PREAMBLE_POWER_RAMPING_COUNTER for beam failure recovery to 1, when the random access procedure is initiated. Further, the MAC entity increments the PREAMBLE_TRANSMISSION_COUNTER for the beam failure recovery by 1, when the RAR reception is not successful or contention resolution is not successful. The MAC entity increments the PREAMBLE_POWER_RAMPING_COUNTER for beam failure recovery by 1, when the UE 650 does not change the beam during PRACH retransmission for the case of beam failure recovery. The multiple Msg1 can overlap inside the beam recovery response window.

Further, the beam failure recovery engine 654 is configured to perform the PRACH using reference signal and the associated RA parameters on the other candidate beam for the beam failure recovery when the timer value is not expired or the maximum retransmission limit for sending the PRACH for the beam failure recovery is not met.

In an embodiment, the beam failure recovery engine 654 is configured to determine whether the CFRA PRACH or the CBRA PRACH to be performed based on the associated RA parameters configured to the UE 650 on the other candidate beam for the beam failure recovery.

In an embodiment, the beam failure recovery engine 654 is configured to perform the CFRA PRACH using the SS block as the reference signal and the associated RA parameters on the other candidate beam for the beam failure recovery.

In another embodiment, the beam failure recovery engine 654 is configured to perform the CFRA PRACH using the CSI-RS as the reference signal and the associated RA parameters on the other candidate beam for the beam failure recovery.

In yet another embodiment, the beam failure recovery engine 654 is configured to perform the CFRA PRACH using the CSI-RS as the reference signal and the associated RA parameters on the other candidate beam for the beam failure recovery and then by using the SS block as the reference signal and the associated RA parameters on the other candidate beam for the beam failure recovery.

In an embodiment, the beam failure recovery engine 654 is configured to perform the CBRA PRACH is performed using the SS block as the reference signal and the associated RA parameters on the other candidate beam for beam failure recovery.

If the timer value is expired or the maximum retransmission limit for sending the PRACH is expired then, the beam failure recovery engine 654 is configured to trigger a Radio Link Failure (RLF) to the BS 600.

In an embodiment, the communicator 658 is configured to communicate with the UE 650 and internally between hardware components in the BS 600. In an embodiment, the processor 660 is configured to process various instructions stored in the memory 662 for handling the beam failure recovery in the wireless communication system.

The memory 662 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 662 may, in some examples, be considered a non-transitory storage medium. The term "non-transitory" may indicate that the storage medium is not embodied in a carrier wave or a propagated signal. However, the term "non-transitory" should not be interpreted that the memory 662 is non-movable. In some examples, the memory 662 can be configured to store larger amounts of information than the memory. In certain examples, a non-transitory storage medium may store data that can, over time, change (e.g., in Random Access Memory (RAM) or cache).

In an embodiment, consider the UE 650 is configured to send the PRACH (i.e., Msg1) on the candidate beam (e.g., CSI-RS). The UE 650 waits for a recovery response in the RAR window. Further, if a positive response (i.e., recovery response) is received from the BS 600 then, a beam failure recovery procedure is ended. Otherwise, the UE 650 can search for more candidate beams for the beam failure recovery. Furthermore, if there is an expiry of the timer value or the maximum retransmission limit expired, then the UE 650 is configured to trigger the RLF to higher layers. In an example, the medium access control (MAC) layer is the higher layer and the lower layer can be physical layer and the data link layer of a protocol stack.

Although the FIG. 6 shows various hardware components of the BS 600 and the UE 650 but it is to be understood that other embodiments are not limited thereon. In other embodiments, the BS 600 and the UE 650 may include less or more number of components. Further, the labels or names of the components are used only for illustrative purpose and does not limit the scope of the invention. One or more components can be combined together to perform same or substantially similar function of handling the beam failure recovery in the wireless communication system.

Further, some new requirements from NR also make non-contention based random access inefficient. To maintain high data rate, fast hand-over is essential with stringent delay constraint. However, due to the density of the PRACH might be low, using those PRACH may not be enough which would lead to large delay, which cannot fulfill the delay requirement for fast hand-over. Further, CSI-RS based RACH procedure has been agreed for the case of handover purposes. Here we discuss the feasibility of performing RACH procedure based on CSI-RS for the case of beam recovery. As a baseline, CSI-RS has been agreed to be sued for the beam recovery procedure. This includes all steps in beam recovery starting from identification of beam failure and sending a recovery request. This recovery request can be sent via a PRACH. The traditional contention-free RACH mechanism is sufficient to support this beam recovery procedure and a 4-step RACH procedure is not necessary (as the UE context exists with the network and beam recovery is entirely an L1 procedure). Further, Ran1 agreed to support carriers without SS blocks. In such carriers, to support beam management CSI-RS must be configured. In such cases, the beam recovery procedure can be supported only via CSI-RS. Hence, the necessary PRACH procedure for the same must be supported via CSI-RS.

Further, the difference between handover and beam recovery is that beam recovery is a random event and recovery resources cannot be configured for the same after receiving a request as it may increase the delay in the recovery procedure. Hence, if PRACH is supported as the recovery mechanism the resources and/or preambles for the same may be defined in a dedicated manner. If the resources are shared with initial access RACH, then dedicated preambles for the purpose of beam recovery may be defined. A dedicated preamble for the same may be given to the UE at connection setup phase. However, if the preambles are limited, then the PRACH resources must be defined in a dedicated manner only for this purpose. These resources can be FDM or TDM. Performance of CDM-based mechanisms highly depends on the channel conditions and may lose orthogonality in extreme Doppler and fading conditions. Further, in order to avoid additional signaling of the time location of these resources, the network may choose to define these in an FDM manner with the initial access RACH resources. Since the available RACH preambles are already limited and may not be extended at least in the Phase-1 of NR, it is preferred to define dedicated PRACH resources for the case of beam recovery.

The retransmission behavior for this RACH procedure is same as the contention free RACH procedure. A configurable number of PRACH attempts will be made by the UE, as agreed in the last meeting, and beyond this the UE may indicate to the higher layers about such a failure. A maximum retransmission limit for the case of beam failure recovery may be indicated to the UE which may or may not be different from the initial access RACH. This limit may be indicated to the UE at the connection setup phase as it is not needed before this procedure. If gNB configures SS block for beam recovery, then RACH based on same can be used. If none of the contention-free RACH resources are configured for beam recovery purposes, then contention-based RACH whenever it is available for UE can be used i.e., the earliest RACH configuration indicates the slot/symbol where RACH resources are available can be used. Some t/f resources for the recovery purposes and then map the CSI-RS/SS to these resources are designed. Further, the total number of resources will depend on the gNB implementation. Further, dedicated preambles to UE at RRC CONN stage is given. Then for each CSI-RS/SS, some FDM of resources which different UEs can choose randomly to minimize collisions are defined.

FIG. 7 is a sequence diagram illustrating various signaling messages communicated between the BS 600 and the UE 650 for handling the beam failure recovery in the wireless communication system, according to an embodiment as disclosed herein.

At step 702, the UE 650 establishes a radio resource control (RRC) connection with the BS 600. At step 704, the BS 600 can configure the reference signal and the associated RA parameters. The BS 600 configures the beam to the UE 650 for receiving the PDCCH, where the beam is indicated using one of:
  a. Explicitly configuring one Periodic CSI-RS (P-CSI-RS) or SS block, where P is the period of a CSI-RS transmission
  b. Implicitly configuring the P-CSI-RS or SS block associated with the Target Cell Identity (TCI) configured to one PDCCH.

In one embodiment, the BS may transmit the reference signal to the UE according to a period and a slot offset which are configured in resource for the reference signal. For example, the BS may transmit the CSI-RS to the UE according to a period and a slot offset which are configured in resource for the CSI-RS.

At step 706, the UE 650 detects that there exist the beam failure (e.g., object blockage) based on a failure of decoding the PDCCH associated with the beam. The beam failure condition is determined based on Block Error Rate (BLER) on the PDCCH, where the BLER is a ratio of the number of erroneous blocks to the total number of blocks transmitted. The UE 650 detects that the consecutive number of PDCCH is failed then the UE 650 detects that there is the beam failure.

At step 708, the UE 650 identifies the candidate beam based on the reference signal. The candidate beam is identified based on the RSRP measurement on the reference signal. Further, at step 710, the UE 650 is configured to perform the beam failure recovery request using the PRACH on the identified candidate beam. The UE 650 can send the beam recovery request via the PRACH, only if the number of consecutive detected beam failure instance exceeds a configured maximum number. In one embodiment, sending the beam recovery request via the PRACH comprises transmitting a random access preamble for the beam failure recovery. In one embodiment, the candidate beam may include a beam for uplink or downlink. Also, the candidate beam may be a beam that is not used for data communication but is good enough to allow data communication. When the UE identifies the candidate beam based on the reference signal, the UE may report N beams of good quality to the BS. And, the BS may select most appropriate beam among the N beams and transmit the most appropriate beam to the UE. Then, the UE may use the most appropriate beam for data communication. The remaining N−1 beams may be candidate beams.

At step 712, the UE 650 is configured to monitor the beam failure recovery response for the PRACH, from the BS 600. If the UE 650 receives the beam failure recovery response with the RAR window specified in the RA parameters then, the UE 650 considers that the recovery response reception is successful and stops a beam failure recovery procedure.

If the UE 650 does not receive the beam failure recovery response within the RAR window, the UE 650 can retransmit the PRACH on the other candidate beam and wait for the timer value. Further, if the UE 650 does not receive the recovery response after the maximum number of retransmission of PRACH, the UE 650 can report the beam failure to the BS 600. Further, the beam failure is determined when all serving beams (e.g., SS block, CSI-RS) fails. The UE 650 can report the beam failure to the higher layers. In one embodiment, the number of retransmission of PRACH is transmitted to the UE through a RRC parameter (i.e. the RRA parameter).

FIGS. 8A and 8B are flow diagrams illustrating various operations for handling the beam failure recovery in the wireless communication system, according to an embodiment as disclosed herein. The flow diagrams from FIG. 8A to FIG. 8B are connected as a flow diagram 800.

At 802, the method includes configuring, by the BS 600, the beam failure recovery configuration include at least one reference signal for identifying the candidate beam for the beam failure recovery and associated RA parameters. In an embodiment, the method allows the beam failure recovery engine 604 to configure the beam failure recovery configuration include at least one reference signal for identifying the candidate beam for the beam failure recovery and associated RA parameters.

At 804, the method includes indicating, by the BS 600, the beam failure recovery configuration to the UE 650 for the beam failure recovery. In an embodiment, the method allows the configuration indicator 606 to indicate the beam failure recovery configuration to the UE 650 for the beam failure recovery.

At 806, the method includes receiving, by the UE 650, the beam failure recovery configuration includes the at least one reference signal for identifying the candidate beam for the beam failure recovery and associated RA parameters from the BS 600. In an embodiment, the method allows the beam failure recovery engine 654 to receive the beam failure recovery configuration.

At 808, the method includes identifying, by the UE 650, the candidate beam for the beam failure recovery using the at least one reference signal. In an embodiment, the method allows the candidate beam identifier 656 to identify the candidate beam for the beam failure recovery using the at least one reference signal.

At 810, the method includes performing, by the UE 650, the PRACH using the at least one reference signal and the associated RA parameters on the candidate beam for the beam failure recovery. In an embodiment, the method allows the beam failure recovery engine 654 to perform the PRACH using the at least one reference signal and the associated RA parameters on the candidate beam for the beam failure recovery.

At 812, the method includes detecting, by the UE 650, whether the beam failure recovery response is received from the BS 600. In an embodiment, the method allows the beam failure recovery engine 654 to detect whether the beam failure recovery response is received from the BS 600. In one embodiment, the UE may hear for BS response within RAR window. If there is no response detected by the UE within the RAR window, the UE may perform retransmission of the request. If the response is not detected after a certain number of transmission(s) for beam failure recovery requests (either RACH or PUCCH), UE may notify higher layer entities, and stop from further beam failure recovery.

At 814, the method includes identifying, by the UE 650, whether other candidate beam for the beam failure recovery is available. In an embodiment, the method allows the beam failure recovery engine 654 to identify whether other candidate beam for the beam failure recovery is available. In one embodiment, if no candidate beam is known to UE for recovery request, then UE may send RLF (i.e. trigger RLF).

At 816, the method includes determining, by the UE 650, whether the timer value is expired for the beam failure recovery or the maximum retransmission limit for sending the PRACH for the beam failure recovery is met. In an embodiment, the method allows the beam failure recovery engine 654 to determine whether the timer value is expired for the beam failure recovery or the maximum retransmission limit for sending the PRACH for the beam failure recovery is met.

If the timer value is expired for the beam failure recovery or the maximum retransmission limit for sending the PRACH for the beam failure recovery is met then, at 818, the method includes triggering, by the UE 650, the Radio Link Failure (RLF). In an embodiment, the method allows the beam failure recovery engine 654 to trigger the RLF to the BS 600. In one embodiment, the timer expires, and reaching the retransmission limit may indicate the beam failure recovery has failed. So, the RLF is triggered.

If the timer value is not expired for the beam failure recovery or the maximum retransmission limit for sending the PRACH for the beam failure recovery is not met then, at 820, the method includes performing, by the UE 650, the PRACH using reference signal and the associated RA parameters on the other candidate beam for the beam failure recovery. In an embodiment, the method allows the beam failure recovery engine 654 to perform the PRACH using reference signal and the associated RA parameters on the other candidate beam for the beam failure recovery.

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the invention.

FIG. 9 is a flow diagram 900 illustrating various operations performed by the UE 650 for sending the PRACH for the beam failure recovery, according to an embodiment as disclosed herein.

At 902, the method includes identifying, by the UE 650, the beam failure on the wireless communication system. In an embodiment, the method allows the beam failure recovery engine 654 to identify the beam failure on the wireless communication system.

At 904, the method includes triggering, by the UE 650, the beam failure recovery using the PRACH. In an embodiment, the method allows the beam failure recovery engine 654 to trigger the beam failure recovery using the PRACH.

At 906, the method includes performing, by the UE 650, the PRACH using the CSI-RS as the reference signal until the timer value (T1) expires and the maximum retransmission limit (N1) is met. In an embodiment, the method allows the beam failure recovery engine 654 to perform the PRACH using the CSI-RS as the reference signal until the timer value (T1) expires and the maximum retransmission limit (N1) is met. In one embodiment, the RAR window may be set by considering the timer value (T1) and the maximum retransmission limit (N1) for the CSI-RS. And, the RAR window may be indicated to the UE 650.

Further, the UE 650 waits for the recovery response from the BS 600. If there is no recovery response detected by the UE 650 within the RAR window then, at 908, the method includes performing, by the UE 650, the PRACH using the SS block as the reference signal until the timer value (T2) expires and the maximum retransmission limit (N2) is met. In an embodiment, the method allows the beam failure recovery engine 654 to perform the PRACH using the SS block as the reference signal until the timer value (T2) expires and the maximum retransmission limit (N2) is met. In one embodiment, the performing the PRACH using the SS block may indicate that a signal which is spatial QCL (quasi-co-located) is set as the SS block.

At 910, the method includes triggering, by the UE 650, the RLF when the timer value (T2) expires and the maximum retransmission limit (N2) expires. In an embodiment, the method allows the beam failure recovery engine 654 to trigger the RLF when the timer value (T2) expires and the maximum retransmission limit (N2) expires.

In an embodiment, based on the network configuration, RA parameters such as T1, N1 can be defined with respect to CSI-RS and the parameters such as T2, N2 can be defined with respect to SS block. Further, these RA parameters are indicated to the UE 650 in a specific manner during a RRC connection setup.

In an embodiment, for beam failure recovery, similar to RAR window, a "beam recovery window" is defined. The UE hears for gNB response within this time window. If there is no response detected by the UE within the window, the UE may perform retransmission of the request. If the response is not detected after a certain number of transmission(s) for beam failure recovery requests (either RACH or PUCCH), UE notifies higher layer entities, and stops from further beam failure recovery.

The various actions, acts, blocks, steps, or the like in the flow diagram 900 may be performed in the order presented, in a different order or simultaneously. Further, in some embodiments, some of the actions, acts, blocks, steps, or the like may be omitted, added, modified, skipped, or the like without departing from the scope of the invention.

FIGS. 10A-10C are illustrating a scenario in which the recovery response is received from the BS 600 for the beam failure recovery, according to an embodiment as disclosed herein.

In an embodiment, when the UE 650 receives the recovery response from the BS 600 in response to the transmission of PRACH (e.g., Msg1) then, the UE 650 considers that the recovery response is successful and stops monitoring further responses and stops the beam recovery procedures.

As shown in the FIG. 10A, a single recovery response window exists to cover all Msg1, in which the UE 650 can monitor the recovery response after Msg1 transmission. As shown in the FIG. 10B, the single recovery response window recovers response monitoring after all 'n' Msg1 transmissions. The set of Msg1 transmissions are performed by the UE 650 within the timer value (T1) and further the recovery response is received by the UE 650 from the BS 600 after the 'n' Msg1 transmissions with the timer value (T1). As shown in the FIG. 10C, a multiple recovery response windows for each Msg1 is available for recovery response monitoring after each Msg1 transmission. In the FIGS. 10A-10C, the 'T' means a duration of the RACH occasion.

The BS 600 can configure the UE 650 to use any one of the RAR window configuration as shown in the FIGS.

10A-10C, in order to support multiple Msg1 for the purpose of beam failure recovery. The multiple recovery responses can be multiplexed within one Media Access Control Protocol Data Unit (MAC PDU) corresponding to beam failure recovery response. The MAC PDU comprises the following:

a. MAC Header+zero or more MAC beam recovery responses+padding (optional);
b. One or more MAC sub-PDUs+padding (optional), in which each MAC sub-PDU has independently the beam recovery response.

In an embodiment, each MAC sub-PDU includes one of the following:

a. a MAC sub-header only (or)
b. a MAC sub header and a MAC RAR.

The power ramping rules in the various embodiments of the present disclosure is described below. The power ramping rules for the beam recovery is same as for initial access RACH. Maintain same counters for the case of beam switching, Increment for every failure. If the UE conducts beam switching, the counter of power ramping remains unchanged. The UE calculates the PRACH transmit power for the retransmission of beam recovery if it is possible at least based on the most recent estimate path loss and power ramping. The path loss is measured at least on the CSI-RS associated or on the QCL'ed SS block associated with the PRACH resources/preamble subset for the case where beam recovery Msg1 is sent. When UE reaching the maximum power, If the recalculated power is still at or above the Pc, max, the UE can transmit at maximum power even if it changes its TX beam. This Pc, max can be different from initial access since RACH is sent on CSI-RS (or SS) and higher limit may be allowed for faster beam recovery.

The cyclic shift configuration for beam recovery preamble formats in the various embodiments of the present disclosure is described below. For the case of initial access UL synch does not exist and $N_{cs}$ must be provisioned so as to cover for the ZCZ of the preamble sequence design. It also accommodates for restricted set design such as the high mobility cases. However, this design can be more flexible in case of beam recovery since UL synch already exists for the UEs.

Smaller $N_{cs}$ values configured for the case of beam recovery compared to initial access;

$N_{cs}$ value explicitly indicated to UEs for the case of beam recovery and for a specific preamble formats by the gNB at RRC connection phase;

$N_{cs}$ value also takes into account the UL TA values for various beams and various UEs as TA values may change across beams;

$N_{cs}$ value adjusted by UE based on the corresponding TA value, where base $N_{cs}$ value is indicated to UE by gNB;

Different restricted sets to be used for the case of beam recovery and indicated to UE via RRC signaling.

FIG. 11 is a schematic diagram illustrating multiple preamble formats for short sequence length according to various embodiments of the present disclosure. According to FIG. 11, for 1 symbol PRACH preamble format, multiple preamble formats can be sent anywhere inside slot and no issues whether slot=7/14 symbols while avoiding symbols needed for PDCCH scheduling and PUCCH scheduling to avoid interference. Similar to SS block mapping, leave symbols for PDCCH, PUCCH and then transmit Msg1. Further, for 2 symbol PRACH preamble format, PDCCH only supported, then allowed RACH symbols are {2, 3}, {4, 5}, {6, 7}, {10, 11}, {12, 13}. The GT between symbol index 7 and 8 should be considered. (support format B). In format A, there is no GT in that format. So, gNB cannot receive RACH during the period that PDCCH transmits on symbol 8 since RACH is received with round trip delay at gNB. That is, format B having small number of RACH symbols should be considered in your scenario. Further, in case of 1-symbol PDCCH, allowed RACH symbols are {1, 2}, {3, 4}, {5, 6}, {9, 10}, {11, 12} within a 14 symbol or 7 symbol slot, accordingly.

For 4-symbol PRACH preamble format,

For 1 symbol PDCCH, {1, 2, 3, 4} or {2, 3, 4, 5} or {3, 4, 5, 6} or {4, 5, 6, 7} and same for $2^{nd}$ slot;

For 2-symbol PDCCH, {2, 3, 4, 5} or {3, 4, 5, 6} or {4, 5, 6, 7} and same for second slot;

For 3-symbol PDCCH, {3, 4, 5, 6} or {4, 5, 6, 7} and same for second slot;

Between symbol index 7 and 8, GT should be considered. (support format B).

For 6-symbol PRACH preamble format,

For 1 symbol PDCCH, {1, 2, 3, 4, 5, 6} or {2, 3, 4, 5, 6, 7} and same for $2^{nd}$ slot;

For {1, 2, 3, 4, 5, 6}, both format A and B can be supported. Only format B is supported for {2, 3, 4, 5, 6, 7}.

For 12 symbol PRACH preamble format does not support for 7-symbol slot. A cross-slot transmission should be supported. If 7-symbol slot is supported, then 12-symbol RACH can cause complications and allow cross-slot transmissions and should avoid PDCCH in $2^{nd}$ slot. Because cross-slot transmission in UL may not allow for gNB to schedule PDCCH in the $2^{nd}$ slot (of 7 symbols). FIG. 11 shows multiple preamble formats in 14-symbol slot. In this figure, two symbols from the beginning of slot are assumed for PDCCH and Guard interval. Format C was introduced to enhance coverage enhancement to format A. From the coverage aspect between format A0 and C0, C0 provides better coverage, but the duration of C0 and C1 cannot be aligned with data channel due to their symbol durations (1.5 symbol/2.5 symbol). Further, when it is assumed first two symbols are not used for RACH transmission, format A3 might be allocated across slots. And gNB cannot be allocated consecutive two A3 formats even in 14-symbol slot. When we use format A3, there are three usage case considering 7-symbol slot and 14-symbol slot, as represented in FIG. 3. Considering UL/DL configuration, the RACH transmission should be done within 7-symbol slot or 14-symbol slot.

Figure 12:
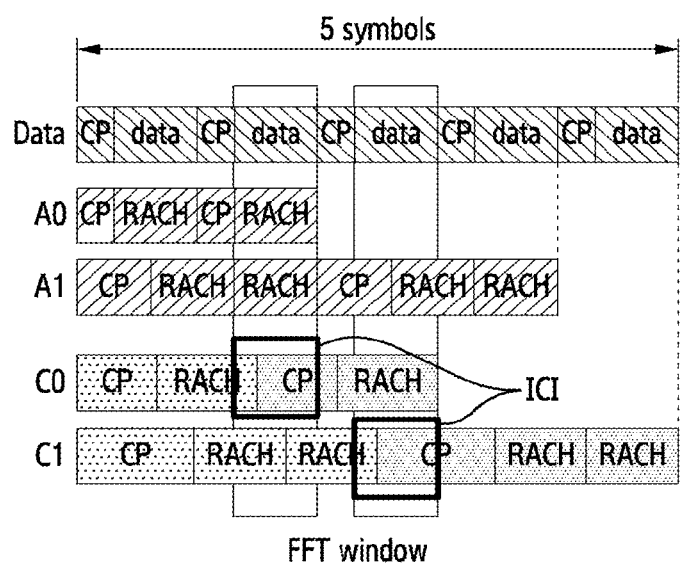
FIG. 12 is a schematic diagram illustrating format A and C according to various embodiments of the present disclosure.

FIG. 12 is a schematic diagram illustrating format A and C according to various embodiments of the present disclosure. According to FIG. 12, Format C was introduced to enhance coverage enhancement to format A. Further, FIG. 12 shows a detailed example when two consecutive preamble occasions are configured. Further, when gNB perform FFT to second data symbol, format C0 interferes with data. For the case that gNB performs FFT to $3^{rd}$ symbol, ICI happened due to format C1. The advantage of format C compared to format A is to enhance coverage, but wide coverage could be provided from other preamble formats. From the small supportable number of preamble format perspective, format C is not preferred for preamble formats.

Figure 13:
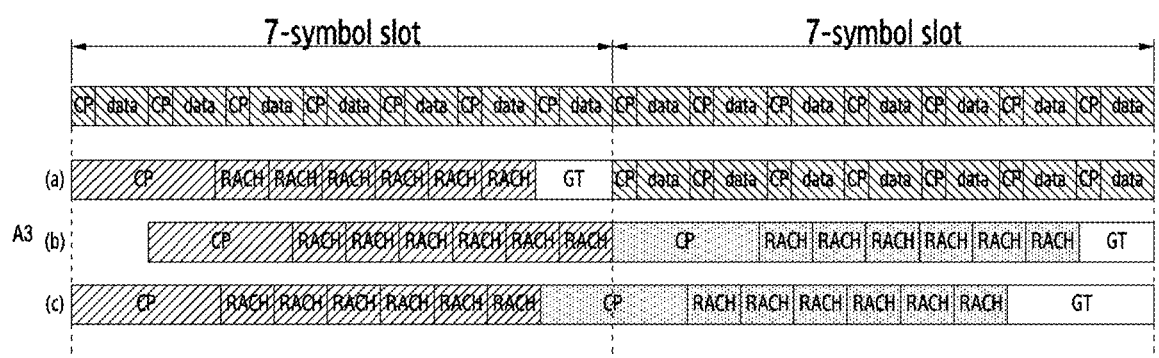
FIG. 13 is a schematic diagram illustrating three different allocations when format A3 is required according to various embodiments of the present disclosure.

FIG. 13 is a schematic diagram illustrating three different allocations when format A3 is required according to various embodiments of the present disclosure; According to FIG. 13, when format A3, there are three usage cases considering 7-symbol slot and 14-symbol slot. Considering UL/DL configuration, the RACH transmission should be done within 7-symbol slot or 14-symbol slot. Figure (a) shows the PRACH mapping within 7-symbol slot. Format A3 within 7-symbol slot should be allocated at the first symbol as the last OFDM symbol can be used as GT to avoid ISI to following data channel. Figure (b) and (c) show cases when two preamble format occasions are considered during 14-symbol slot. Preamble format should be aligned with symbol inside 7 or 14-symbol slot and should avoid cross-slot transmissions.

Figure 14:
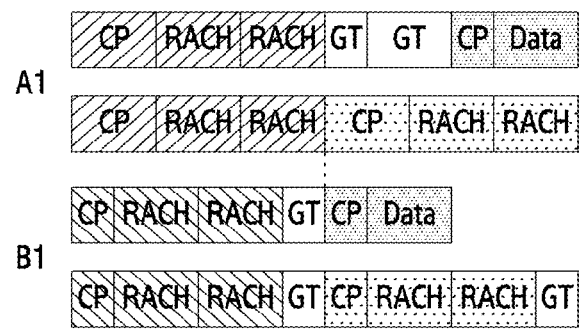
FIG. 14 is a schematic diagram illustrating RACH preamble format according to presence of GT according to various embodiments of the present disclosure.

FIG. 14 is a schematic diagram illustrating RACH preamble format according to presence of GT according to various embodiments of the present disclosure; According to FIG. 14, two preamble format transmissions are present based on format 'A' and format 'B'. The usage of format B is to avoid ISI to following data symbol as GT is located at the end of preamble format.

Figure 15:
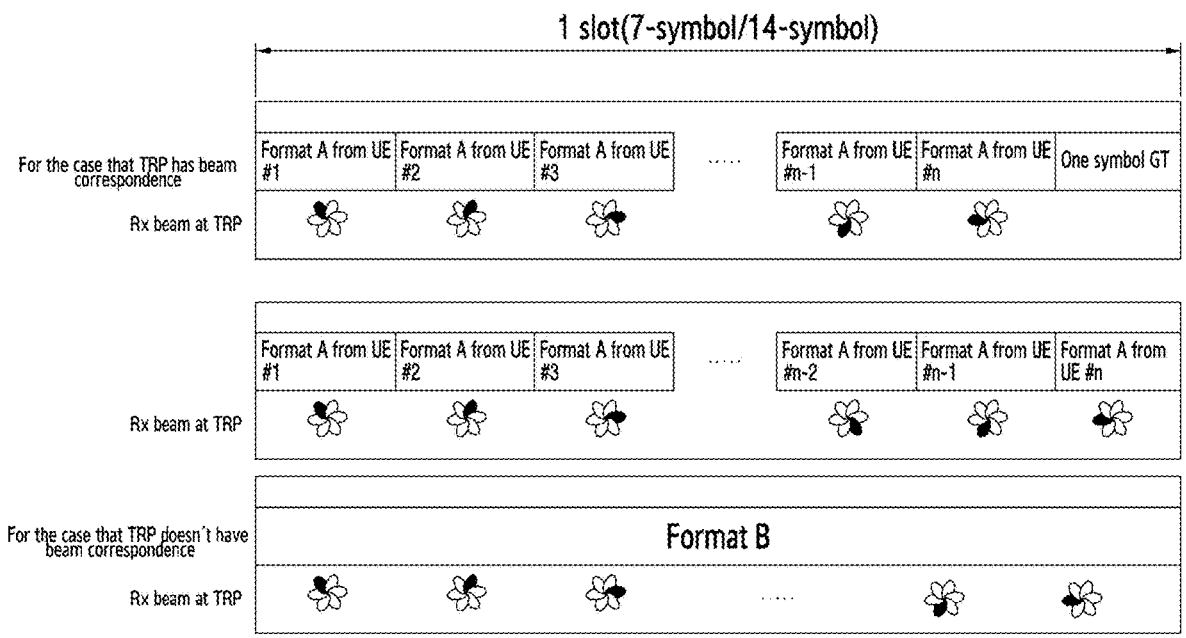
FIG. 15 is a schematic diagram illustrating usage scenarios for various formats (A and B) according to various embodiments of the present disclosure.

FIG. 15 is a schematic diagram illustrating usage scenarios for various formats (A and B) according to various embodiments of the present disclosure. According to FIG. 15, format A, TRP is used for beam correspondence and for format B, TRP does not have beam correspondence. When two preamble formats are configured, the GT between two preamble format B may harm to data channel decoding. Therefore, it is preferable to locate format B at the end of slot. For the format A, when gNB scheduled data after RACH occasion, one-symbol guard interval between data and format A should be supported. Meanwhile, for the period that two PRACH formats are received, the last RACH occasion can be allocated for format B or one symbol-length guard interval can be inserted.

Further, a preamble based on format B is located at the end of the 7/14 symbol slot and avoid any resource wastage due to GT insertion. Further, mapping of multiple PRACH preamble formats depends on the number of PDCCH symbols. Further, 1 symbol duration preamble format, A0/B0

Format A0 and B0 are exactly same. Therefore, format B0 is to be removed. Format A0 can be sent anywhere inside slot and there will be no issues whether a slot is 7/14 symbols while avoiding symbols needed for PDCCH scheduling. For 1 symbol preamble format, using format A0 is sufficient.

2 symbol duration preamble format, A1/B1

As we discussed earlier, allocating format B at the end of slot is preferred to avoid resource wastage, we don't see the usage scenario for using format B1. For 2 symbol preamble format, using format A1 is sufficient.

4 symbol duration preamble format, A2/B2

Format A2 is already agreed. Below table shows the candidate PRACH symbol mapping in a slot:

| Slot type | Possible symbol mappings | | | |
| --- | --- | --- | --- | --- |
| | No PDCCH | 1 symbol PDCCH | 2 symbol PDCCH | 3 symbol PDCCH |
| 7 symbol slot | No issue | {2, 3, 4, 5}, {3, 4, 5, 6}*, {9, 10, 11, 12}, {10, 11, 12, 13}* | {3, 4, 5, 6}* {10, 11, 12, 13}* | No room |
| 14 symbol slot | No issue | No issue | No issue | No issue |

For mapping of Format B, in 14 symbol slot, format A and B can be supported while avoiding symbols need for PDCCH scheduling or guard interval. In 7 symbol slot, format A can support only the case that 1 symbol PDCCH is scheduling. When format B, 1 or 2 symbol is used, PDCCH scheduling can be supported. Although using format B2 may provide more TRP scheduling flexibility, the advantage seems not significant. When format A2 is allocated at the beginning of slot, it can act like B2 with more GT. Further, a 6-symbol duration preamble format, A3/B3, format A is allocated at the beginning of a slot when 7-symbol slot is configured. In 14-symbol slot, format A can be allocated at the first/second symbol index. Similar to t-symbol duration preamble format case, format A can act like format B according to its allocation.

Figure 16:
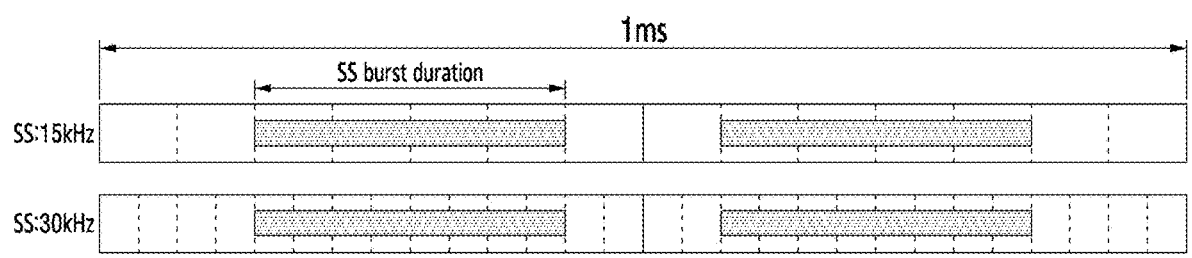
FIG. 16 is a schematic diagram illustrating RACH mapping according to various embodiments of the present disclosure.

FIG. 16 is a schematic diagram illustrating RACH mapping according to various embodiments of the present disclosure. According to FIG. 16, the gNB can configure the UE about the RACH occasions based on the PDCCH durations. gNB can dynamically indicate this RACH configuration. gNB indicates which format to use where A and B or A with guard period or A with C or C alone etc. This signaling can be done via RACH configuration. Similar to mapping of the SS blocks based on SCS, RACH mapping can be done based on the sub-carrier spacing for the RACH while avoiding the PDCCH duration. Further, sub-frame index etc. must be indicated in terms of the reference SS block numerology. Then depending on indication and preamble format, the UE will adjust accordingly to fit within the subframe.

Figure 17:
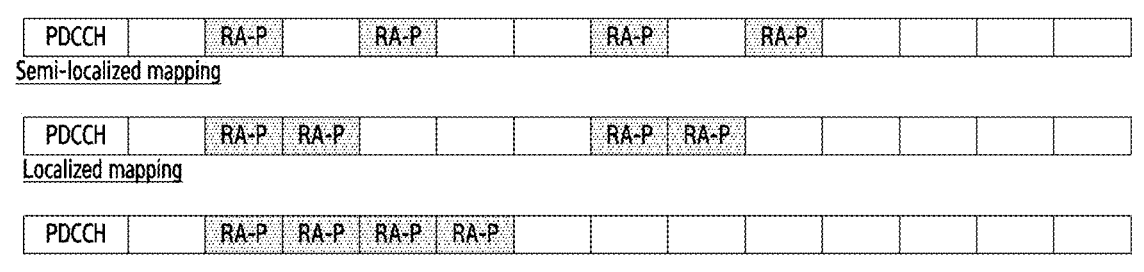

FIG. 17 is a schematic diagram illustrating various kinds of RACH mapping according to various embodiments of the present disclosure. According to FIG. 17, distributed mapping may be better for latency sensitive applications. In this, mapping pattern depends on parameters in RACH configuration. In RACH configuration, the subframe index may be informed in a frame. Both localized and distributed mapping can be utilized depends on parameters. Further, distributed mapping can be good for beam correspondence based devices. For BC devices, they only need to send one RACH preamble. Then they may also receive RAR immediately if the adjacent symbols are not reserved for the case of RA-P transmissions. Further, localized mapping is good for no beam correspondence devices. For no BC cases, they need beam sweep. So, it is better if beam sweep is performed consecutively and by; one-shot (one-shot beam sweeping of "N" beams over "N" consecutive symbols); then RAR window can start immediately at the end of the "N" symbols. Otherwise in case of distributed mapping, the UE will have to wait a long time for sending the RACH on the $N^{th}$ beam. This can cause access latency issues. Further, semi-localized can be good for partial beam correspondence devices. Semi-localized can be good for partial beam correspondence devices which is most likely the case of most user devices.

For 15 kHz subcarrier spacing, the first OFDM symbols of the candidate RACH symbols in time domain have the OFDM symbol indices {2, 8}+14*n within the half frame which may contain RACH resources. For carrier frequencies smaller than or equal to 3 GHz, n=0, 1. For carrier frequencies larger than 3 GHz and smaller than or equal to 6 GHz, n=0, 1, 2, 3. The number of RACH resources mapping depends on the SS blocks mapping. This can be done exactly for 1-1 mapping between SS blocks and RACH resources. If this 1-1 mapping cannot be done, then some of these symbols can be left empty. More resources can be allotted in frequency domain for many-to-one mapping.

Further, for 30 kHz subcarrier spacing (first pattern), the first OFDM symbols of the candidate RACH symbols in time domain have the OFDM symbol indices {4, 8, 16, 20}+28*n within the half frame which contains the RACH resources. For carrier frequencies smaller than or equal to 3 GHz, n=0. For carrier frequencies larger than 3 GHz and smaller than or equal to 6 GHz, n=0, 1. For 30 kHz subcarrier spacing (second pattern), the first OFDM symbols of the candidate RACH symbols in time domain have the OFDM symbol indices {2, 8}+14*n within the half frame which contains the RACH resources. For carrier frequencies smaller than or equal to 3 GHz, n=0, 1. For carrier frequencies larger than 3 GHz and smaller than or equal to 6 GHz, n=0, 1, 2, 3. For 120 kHz subcarrier spacing, the first OFDM symbols of the candidate RACH symbols in time domain have the OFDM symbol indices {4, 8, 16, 20, 32, 36, 44, 48}+70*n within the half frame which contains the RACH resources. For carrier frequencies larger than 6 GHz, n=0, 1, 2, 3, 4, 5, 6, 7. For 240 kHz subcarrier spacing, the first OFDM symbols of the candidate RACH symbols in time domain have the OFDM symbol indices {8, 12, 16, 20, 32, 36, 40, 44, 64, 68, 72, 76, 88, 92, 96, 100}+140*n within the half frame which contains the RACH resources. For carrier frequencies larger than 6 GHz, n=0, 1, 2, 3.

The embodiments disclosed herein can be implemented through at least one software program running on at least one hardware device and performing network management functions to control the elements. The elements shown in the FIGS. 1 through 10c include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station (BS) in a wireless communication system the base station comprising:
 a transceiver; and
 at least one processor operably coupled to the transceiver, wherein the at least one processor is configured to:
  transmit, to a terminal, a beam failure recovery configuration including:
   information on random access channel (RACH) resource for identifying a candidate beam associated with synchronization signal block (SS block) resource or channel state information-reference signal (CSI-RS) resource,
   a maximum number of RACH transmissions for a beam failure recovery,
   a power ramping value, and
   information on a length of random access response (RAR) window; and
  receive, from the terminal, a random access preamble for a beam failure recovery request based on the candidate beam,
 wherein the information on the length of the RAR window in the beam failure recovery configuration is a number of slots configured by the BS.

2. The base station of claim 1, wherein the candidate beam is identified based on a reference signal received power (RSRP) threshold configured for the beam failure recovery.

3. The base station of claim 1, wherein the beam failure recovery configuration further includes a timer for beam failure recovery.

4. The base station of claim 1, wherein the RAR window is used to monitor a response of the random access preamble for the beam failure recovery.

5. The base station of claim 1, wherein the information on the RACH resource for identifying the candidate beam associated with the SS block resource includes SS block index and RA preamble index.

6. The base station of claim 1, wherein the information on the RACH resource for identifying the candidate beam associated with the CSI-RS resource includes non-zero-power (NZP) CSI-RS Id and RA preamble index.

7. A method performed by a base station (BS) in a wireless communication system, the method comprising:
transmitting, to a terminal, a beam failure recovery configuration including:
information on random access channel (RACH) resource for identifying a candidate beam associated with synchronization signal block (SS block) resource or channel state information-reference signal (CSI-RS) resource,
a maximum number of RACH transmissions for a beam failure recovery,
a power ramping value, and
information on a length of random access response (RAR) window; and
receiving, from the terminal, a random access preamble for a beam failure recovery request based on the candidate beam,
wherein the information on the length of the RAR window in the beam failure recovery configuration is a number of slots configured by the BS.

8. The method of claim 7, wherein the candidate beam is identified based on a reference signal received power (RSRP) threshold configured for the beam failure recovery.

9. The method of claim 7, wherein the beam failure recovery configuration further includes a timer for beam failure recovery.

10. The method of claim 7, wherein the RAR window is used to monitor a response of the random access preamble for the beam failure recovery.

11. The method of claim 7, wherein the information on the RACH resource for identifying the candidate beam associated with the SS block resource includes SS block index and RA preamble index.

12. The method of claim 7, wherein the information on the RACH resource for identifying the candidate beam associated with the CSI-RS resource includes non-zero-power (NZP) CSI-RS Id and RA preamble index.

13. A terminal in a wireless communication system comprising:
at least one processor; and
a transceiver configured to:
receive, from a base station (BS), a beam failure recovery configuration including:
information on random access channel (RACH) resource for identifying a candidate beam associated with synchronization signal block (SS block) resource or channel state information-reference signal (CSI-RS) resource,
a maximum number of RACH transmissions for a beam failure recovery,
a power ramping value, and
information on a length of random access response (RAR) window; and
transmit, to the BS, a random access preamble for a beam failure recovery request by using on the candidate beam,
wherein the information on the length of the RAR window in the beam failure recovery configuration is a number of slots configured by the BS.

14. The terminal of claim 13, wherein the at least one processor is further configured to identify the candidate beam based on reference signal received power (RSRP) threshold configured for the beam failure recovery.

15. The terminal of claim 13, wherein the at least one processor is further configured to monitor a response of the random access preamble for the beam failure recovery in the RAR window.

16. The terminal of claim 13, wherein the information on the RACH resource for identifying the candidate beam associated with the SS block resource includes SS block index and RA preamble index.

17. The terminal of claim 13, wherein the information on the RACH resource for identifying the candidate beam associated with the CSI-RS resource includes non-zero-power (NZP) CSI-RS Id and RA preamble index.

18. The terminal of claim 13, wherein the at least one processor is further configured to transmit, to the base station, the random access preamble for the beam failure recovery until a timer for the beam failure recovery is expired.

19. The terminal of claim 13, wherein if the terminal transmits a random access preamble which is not changed from a previous transmitted random access preamble for the beam failure recovery, a power ramping counter for the random access preamble is increased by 1.

20. The terminal of claim 13, wherein if a RAR reception is not successful or contention resolution is not successful, a transmission counter for the random access preamble is increased by 1.

* * * * *

UNITED STATES PATENT AND TRADEMARK OFFICE
CERTIFICATE OF CORRECTION

| | | |
|---|---|---|
| PATENT NO. | : 11,832,093 B2 | Page 1 of 1 |
| APPLICATION NO. | : 17/532873 | |
| DATED | : November 28, 2023 | |
| INVENTOR(S) | : Amuru et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 25 days.

Signed and Sealed this
First Day of July, 2025

Coke Morgan Stewart
*Acting Director of the United States Patent and Trademark Office*